US006256036B1

(12) United States Patent
Matsumoto

(10) Patent No.: US 6,256,036 B1
(45) Date of Patent: Jul. 3, 2001

(54) THREE-DIMENSIONAL MODELING APPARATUS FOR PRODUCING THREE-DIMENSIONAL MODEL OF OBJECT OF INTEREST AND METHOD THEREFOR

(75) Inventor: Yukinori Matsumoto, Tsukuba (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/149,046

(22) Filed: Sep. 8, 1998

(30) Foreign Application Priority Data

Sep. 9, 1997 (JP) .................................................... 9-243650
Jan. 14, 1998 (JP) .................................................. 10-005982

(51) Int. Cl.[7] .................................................. G06T 15/00
(52) U.S. Cl. ............................................................. 345/419
(58) Field of Search ..................................... 345/418, 419, 345/423, 424

(56) References Cited

U.S. PATENT DOCUMENTS 5,825,997 * 10/1998 Yamada et al. ...................... 345/419
5,831,619 * 11/1998 Nakagawa et al. ................... 345/419
5,982,375 * 11/1999 Nelson et al. ........................ 345/419

OTHER PUBLICATIONS

"Estimation of Object Shape and Color by Bidirectional Voting Using Continuous Color Images", Hisayoshi Zaima et al., 53rd National Meetings of Information Processing Society of Japan (The 2nd half of 1996), pp. 2–301 and 302.
"Photorealistic Scene Reconstruction by Voxel Coloring", Steven M. Seitz et al., Computer Vision and Pattern Recognition 1997, pp. 1067–1073.

* cited by examiner

Primary Examiner—Cliff N. Vo
(74) Attorney, Agent, or Firm—Armstrong, Westerman, Hattori, McLeland & Naughton, LLP

(57) ABSTRACT

A three-dimensional modeling apparatus capable of producing a three-dimensional model of an object of interest having a recessed part shoots an object of interest from a plurality of visual points, votes density information on a central image and peripheral images among a plurality of obtained object images for a corresponding Voxel in a prepared Voxel space, calculates the standard deviation of the density information voted for each Voxel, and estimates the shape of the object of interest by smoothly coupling Voxels with small standard deviation among the Voxels in the Voxel space.

20 Claims, 31 Drawing Sheets

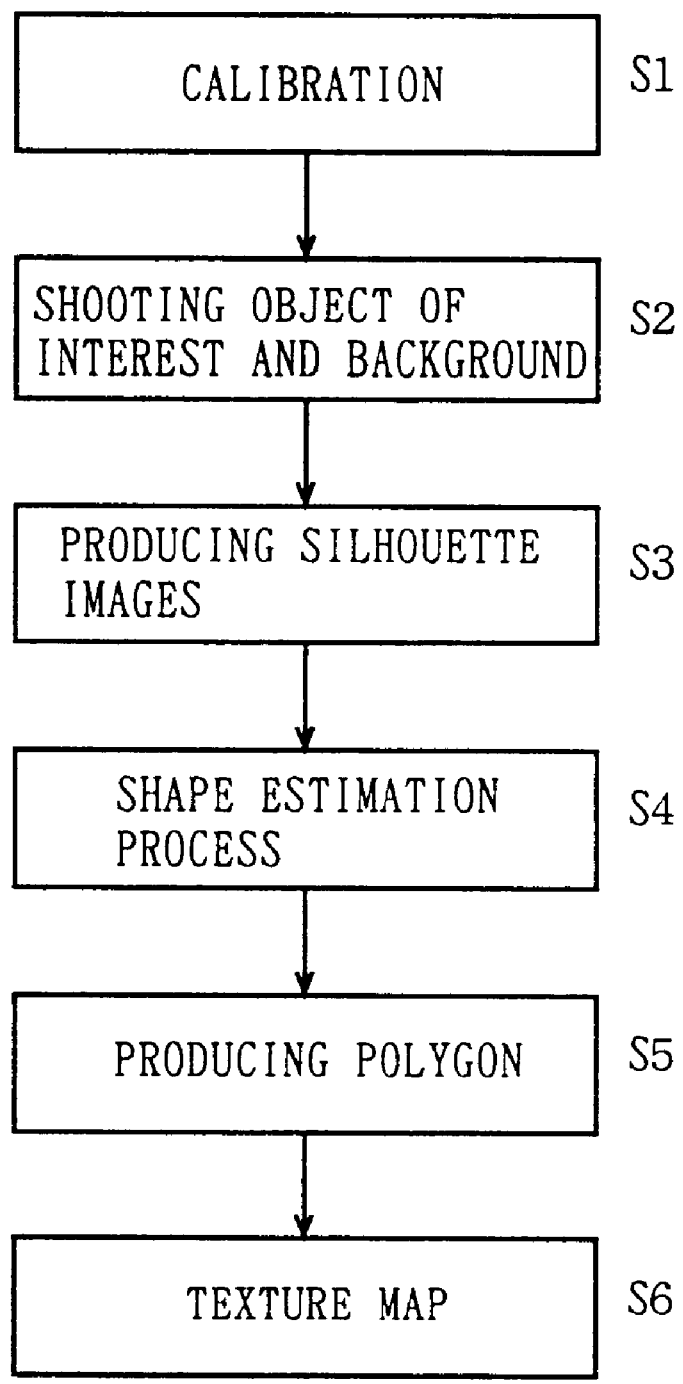

SHOOTING IMAGE

PRODUCING SILHOUETTE

VOTING PROCESS

PRODUCING POLYGON

TEXTURE MAP

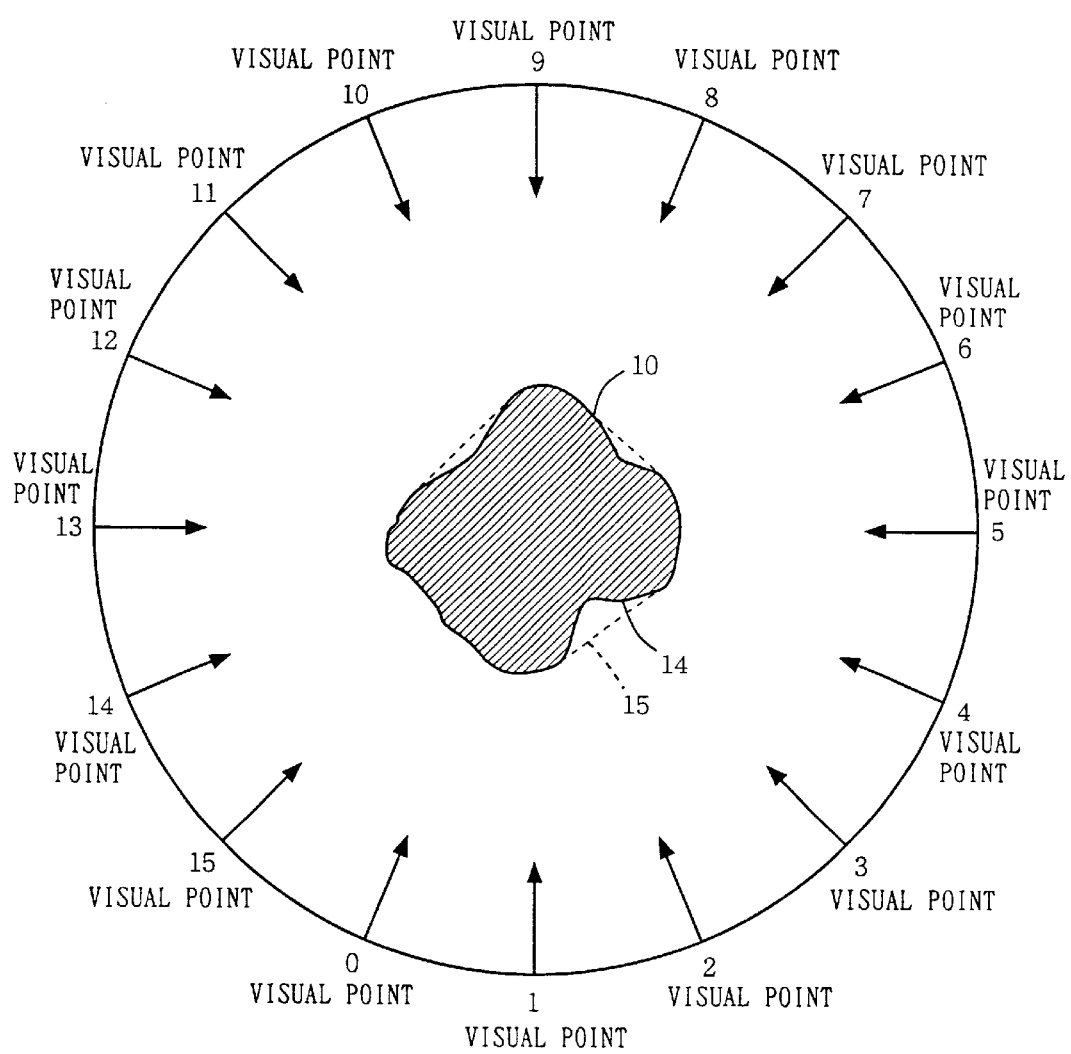

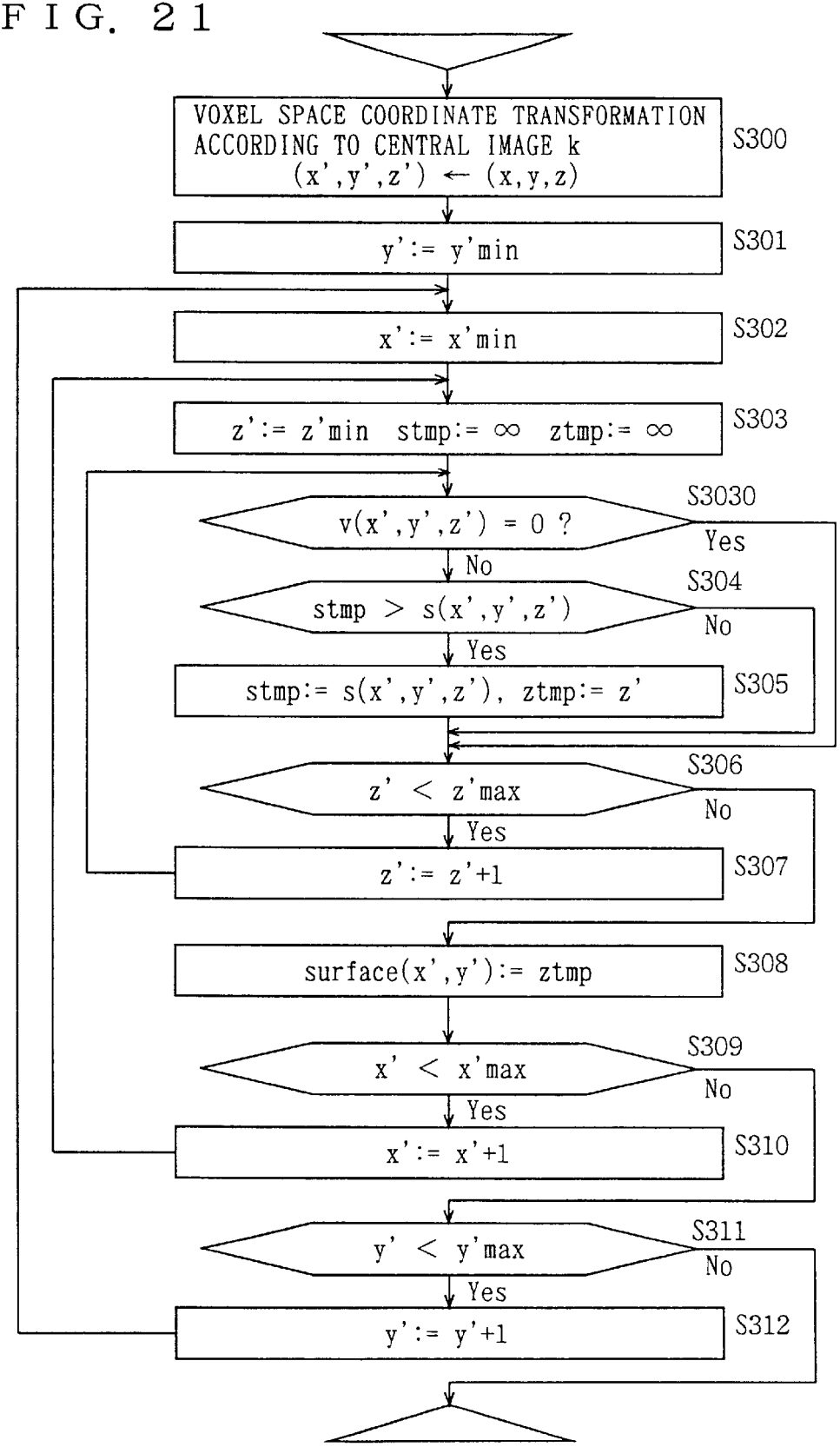

VISUAL POINT

VISUAL POINT (ox, oy, oz)
(CORRESPONDING TO CENTRAL IMAGE k)

THREE-DIMENSIONAL MODELING APPARATUS FOR PRODUCING THREE-DIMENSIONAL MODEL OF OBJECT OF INTEREST AND METHOD THEREFOR

BACKGROUND OF THE INVENTION

1. Field of the Invention

The present invention relates generally to three-dimensional modeling apparatuses and methods therefor, media storing three-dimensional modeling programs, and media storing three-dimensional estimation programs, and more particularly, to a three-dimensional modeling apparatus for producing a three-dimensional model of an object of interest, a method therefor, and a medium storing three-dimensional modeling programs.

2. Description of the Background Art

In general, in order to produce a three-dimensional graphics image, a three-dimensional model expressing the shape and texture (color and patterns) of a three-dimensional object of interest is produced.

Conventional three-dimensional modeling methods for producing three-dimensional models include for example silhouette and stereo methods. In the silhouette method, an object of interest is shot by monocular cameras from a plurality of visual points, and a three-dimensional model of the object is produced based on a plurality of resulting silhouettes.

In the silhouette method, however, a three-dimensional model is produced based on the contour of the shot object, any recessed part of the object is hardly expressed.

A method of estimating the shape of an object of interest by voting color information is disclosed by "Estimation of Object Shape and Color by Bidirectional Voting Using Continuous Color Images", Hisayoshi Zaiman et al., 53rd National Meetings of Information Processing Society of Japan (The 2nd half of 1996), pp 2–301 and 302. The method is based on the assumption that the same color should be voted in a surface Voxel. According to the method, however, color voting is conducted using all the image information, and image information in the backside direction is also voted for a surface Voxel. As a result, different colors are usually voted for a surface Voxel. In order to solve this problem, color candidates voted for a Voxel should be selected. For the selection process, the method requires a large amount of memories for retaining all the colors voted. In addition, in order to determine a surface Voxel by extracting the identity of colors among the candidates, the same part should be always shot by the same color. Alternatively, a threshold should be set for determining the sameness of colors. Thus setting the threshold generally involves difficult processes.

SUMMARY OF THE INVENTION

It is an object of the present invention to provide a simple and inexpensive three-dimensional modeling apparatus capable of expressing a recessed part of an object of interest and a method therefor.

According to the present invention, a three-dimensional modeling apparatus for producing a three-dimensional model of an object of interest includes an object image capturing device, a shape estimation unit, and a producing unit. The object image capturing device shoots an object of interest from a plurality of visual points to obtain a plurality of object images. The shape estimation unit estimates the shape of the object of interest based on dispersion in image information between at least two object images among the plurality of object images. The producing unit produces a three-dimensional model based on the estimated shape.

Preferably, the image information of the object images is on color and/or density. Here, density is the intensity of a pixel of a gray-scale image.

The shape estimation unit preferably includes an image information accumulation unit and a calculation unit. The image information accumulation unit accumulates corresponding image information on at least two object images in each region of a three-dimensional virtual space formed by a plurality of regions, more specifically, in a storage region corresponding to each region. The calculation unit calculates dispersion in the image information accumulated in the region.

The three-dimensional modeling apparatus preferably further includes a presence region estimation unit. The presence region estimation unit approximately estimates a region in which an object of interest is present in the three-dimensional virtual space based on the contour of the object in the plurality of object images. The image information accumulation unit accumulates image information in a region within the presence region among the region of the three-dimensional virtual space. Herein, the image information is preferably accumulated only in a region within the presence region.

The shape estimation unit preferably further includes a coupling unit. The coupling unit smoothly couples regions with small dispersion among the regions of the three-dimensional virtual space, in order to estimate the shape of the object.

The coupling unit preferably minimizes an evaluation function using as a variable the smallness of dispersion and the smoothness of regions to be coupled, in order to smoothly couple regions with small dispersion.

The shape estimation unit preferably further includes a coordinate transformation unit and a coupling unit. The coordinate transformation unit transforms one coordinate space visual point in a three-dimensional virtual space into a perspective coordinate space having radial coordinate axes. The coupling unit couples regions having the minimum dispersion or dispersion larger than the minimum value by a prescribed value among regions on a straight line passing through one visual point in the perspective coordinate space. The coordinate space of the three-dimensional virtual space is a rectangular coordinate space.

The shape estimation unit preferably further includes a coupling unit. The coupling unit couples regions having the minimum dispersion or dispersion larger than the minimum value by a prescribed value among regions on a straight line passing through the visual points in a three-dimensional virtual space, in order to estimate the shape of an object of interest. The coordinate space in the three-dimensional virtual space is further preferably a rectangular coordinate space.

The shape estimation unit preferably includes a partial surface estimation unit and an integration unit. The partial surface estimation unit estimates a plurality of partial surfaces (virtual shapes) of an object of interest based on dispersion in corresponding image information between a plurality of object images. The integration unit integrates the plurality of partial surfaces to determine the shape of the object.

The three-dimensional modeling apparatus preferably further includes a presence region estimation unit. The presence region estimation unit approximately estimates a region in which an object of interest is present in the three-dimensional virtual space based on the contour of the object in the plurality of object images. The shape estimation unit preferably includes an image information accumulation unit, a calculation unit, a partial surface estimation unit and an integration unit. The image information accumulation unit accumulates corresponding image information of at least two object images in each region of a three-dimensional virtual space formed by a plurality of regions, more specifically in a storage region corresponding to each region. The calculation unit calculates dispersion in the image information accumulated in the region. The partial surface estimation unit estimates a plurality of partial surfaces (virtual shapes) of the object of interest based on dispersion in the corresponding image information between the plurality of object images. The integration unit integrates the plurality of partial surfaces to determine the shape of the object. The integration unit includes a distance accumulation unit and a presumption unit. The distance accumulation unit accumulates distances to the plurality of partial surfaces from a region inside the presence region and outside each of the partial surfaces among the regions of the three-dimensional virtual space in the region inside the presence region and outside each of the partial surfaces, more specifically from a storage region corresponding to each region, in that storage region. The presumption unit presumes a region to be outside the object of interest if the region has a sum of accumulated distances larger than a prescribed value. Herein, the three-dimensional modeling apparatus further may include a presence region estimation unit for approximately estimating the presence region of an object of interest in a three-dimensional virtual space based on the contour of the object in a plurality of object images, and the image information accumulation unit may accumulate image information in a region within a presence region among the regions of the three-dimensional virtual space. The shape estimation unit may further include a coupling unit for smoothly coupling regions with small dispersion among the regions of the three-dimensional virtual space, in order to estimate the shape of the object. The coupling unit may minimize an evaluation function having as variables the smallness of dispersion and the smoothness of regions to be coupled. The shape estimation unit may further include a coordinate transformation unit for transforming one of coordinate space visual points in a three-dimension virtual space into a perspective coordinate space having radially extending coordinate axes, and a coupling unit for coupling regions with the minimum dispersion or dispersion larger than the minimum value by a prescribed value among regions on a straight line passing through one visual point in the perspective coordinate space, in order to estimate the shape of the object of interest. The shape estimation unit may further include a coupling unit for coupling regions with the minimum dispersion or dispersion larger than the minimum value by a prescribed value among regions on a straight line passing through one visual point in the three-dimensional virtual space in order to estimate the shape of the object.

The three-dimensional modeling apparatus preferably further includes a presence region estimation unit. The presence region estimation unit approximately estimates a region in which an object of interest is present in the three-dimensional virtual space based on the contour of the object in the plurality of object images. The shape estimation unit preferably includes an image information accumulation unit, a calculation unit, a partial surface estimation unit and an integration unit. The image information accumulation unit accumulates corresponding image information on at least two object images in each region in a three-dimensional virtual space formed by a plurality of regions, more specifically in a storage region corresponding to each region. The calculation unit calculates the dispersion of the image information accumulated in the region. The partial surface estimation unit estimates a plurality of partial surfaces (virtual shapes) of the object of interest based on the dispersion of the corresponding image information between the plurality of object images. The integration unit determines the shape of the object of interest by integrating a plurality of partial surfaces. The integration unit includes a distance accumulation unit, an accumulation number calculation unit, and a presumption unit. The distance accumulation unit accumulates distances to the plurality of partial surfaces from a region inside the presence region and outside each of the partial surfaces among the regions of the three-dimensional virtual space in the region inside the presence region and outside each of the partial surfaces. The accumulation number calculation unit calculates the number of accumulation. The presumption unit presumes a region to be outside of the object of interest if the distance average value of the region produced by dividing the sum of the accumulated distances by the number of accumulation. Herein, the three-dimensional modeling apparatus may further include a presence region estimation unit for schematically estimating the presence region of an object of interest in a three-dimensional virtual space based on the contour of the object in a plurality of object images, and the image information accumulation unit may accumulate image information in a region in the presence region among the regions of the three-dimensional virtual space. The shape estimation unit may further include a coupling unit for smoothly coupling regions with small dispersion among the regions of the three-dimensional virtual space, in order to estimate the shape of the object of interest. The coupling unit may minimize an evaluation function having as variables the smallness of dispersion and the smoothness of regions to be coupled. The shape estimation unit may further include a coordinate transformation unit for transforming one of coordinate space visual points in a three-dimension virtual space into a perspective coordinate space having radially extending coordinate axes, and a coupling unit for coupling regions with the minimum dispersion or dispersion larger than the minimum value by a prescribed value among regions on a straight line passing through one visual point in the perspective coordinate space. The shape estimation unit may further include a coupling unit for coupling regions with the minimum dispersion or dispersion larger than the minimum value by a prescribed value among regions on a straight line passing through one visual point in the three-dimensional virtual space, in order to estimate the shape of the object.

The shape estimation unit preferably includes an image information accumulation unit, a calculation unit, a partial surface estimation unit and an integration unit. The image information accumulation unit accumulates corresponding image information on at least two object images in each region in a three-dimensional virtual space formed by a plurality of regions, more specifically in a storage region corresponding to each region. The calculation unit calculates the dispersion of the image information accumulated in the region. The partial surface estimation unit estimates a plurality of partial surfaces (virtual shapes) of an object of interest based on dispersion of the corresponding image information between a plurality of object images. The integration unit determines the shape of the object of interest by integrating the plurality of partial surfaces. The integration unit includes a voting unit and a presumption unit. The voting unit votes a prescribed first value for a region inside each of the partial surfaces, among the regions of the three-dimensional virtual space. The presumption unit presumes a region having a sum of voted first values larger than a prescribed second value to be outside the object of interest. Herein, the three-dimensional modeling apparatus may further include a presence region estimation unit for approximately estimating the presence region of an object of interest in a three-dimensional virtual space based on the contour of the object in a plurality of object images, and the information accumulation unit may accumulate image information in a region within the presence region among the regions of the three-dimensional virtual space. The shape estimation unit may further include a coupling unit for smoothly coupling regions with small dispersion among the regions of a three-dimensional virtual space, in order to estimate the shape of the object of interest. The coupling unit may minimize an evaluation function having as variables the smallness of dispersion and the smoothness of regions to be coupled, in order to smoothly couple regions with small dispersion. The shape estimation unit may further include a coordinate transformation unit for transforming one of coordinate space visual points in a three-dimension virtual space into a perspective coordinate space having radially extending coordinate axes, and a coupling unit for coupling regions with the minimum dispersion or dispersion larger than the minimum value by a prescribed value among regions on a straight line passing through one visual point in the perspective coordinate space, in order to estimate the shape of the object of interest. The shape estimation unit may further include a coupling unit for coupling regions with the minimum dispersion or dispersion larger than the minimum value by a prescribed value among regions on a straight line passing through one visual point in the three-dimensional virtual space, in order to estimate the shape of the object of interest.

The image information accumulation unit preferably accumulates image information on the basis of a pixel in an object image.

The image information accumulation unit preferably accumulates image information on the basis of a prescribed block including a plurality of pixels in an object image.

Preferably, the region described above is a Voxel, and the three-dimensional virtual space is a Voxel space.

Preferably, the dispersion of the image information is a standard deviation in image information.

Preferably, the shape estimation unit includes a block setting unit and a calculation unit. The block setting unit sets a block including a plurality of pixels for each object image. The calculation unit calculates the difference between the values of corresponding pixels in blocks, and calculates the sum of the square of the calculated difference as the dispersion of the image information.

As stated above, according to the present invention, the shape of an object of interest is estimated based on the dispersion of image information between at least two object images among a plurality of object images obtained by shooting the object from a plurality of visual points, and therefore a three-dimensional model expressing a recessed part of the object body may be produced.

Furthermore, the presence region of an object in a Voxel space is previously approximately estimated based on the contour of the object, and therefore a three-dimensional model of the object may be quickly produced.

Since the shape of an object of interest is estimated by smoothly coupling Voxels with small dispersion, an accurate three-dimensional model may be stably produced if the illumination conditions or the like change.

Furthermore, a coordinate space in a three-dimensional virtual space is transformed into a perspective coordinate space, in which regions with the minimum dispersion or dispersion larger than the minimum value by a prescribed value are coupled among a plurality of regions on a straight line passing through one visual point, and therefore the shape of the object of interest may be estimated at a high speed.

Since regions with the minimum dispersion or dispersion larger than the minimum value by a prescribed value are coupled among a plurality of regions on a straight line passing through one visual point in a three-dimensional virtual space, the shape of the object of interest may be estimated at a high speed.

Since distances to a plurality of partial surfaces from a region inside the presence region and outside each of partial surfaces among the regions of a three-dimensional virtual space are accumulated in that region, and a region where the sum of the accumulated distances is larger than a prescribed value is presumed to be outside the object of interest, the shape of the object of interest may be relatively accurately determined.

Since a prescribed value is voted for a region inside each of partial surfaces among the regions of a three-dimensional virtual space, and a region where the sum of the voted values is larger than a prescribed value is presumed to be inside, the object of interest, the shape of the object of interest may be determined at a high speed.

Furthermore, since image information is accumulated for each prescribed block including a plurality of pixels, a three-dimensional model of the object of interest may be more precisely produced.

Since a block including a plurality of pixels is set in each object image the difference between the values of corresponding pixels in blocks are calculated, and the sum of the absolute values of the calculated differences is calculated as dispersion, the shape of the object of interest may be estimated at a high speed.

Furthermore, a block including a plurality of pixels is set in each object image, the difference between the values of corresponding pixels in the blocks is calculated, and the sum of the square of the calculated differences is calculated as the dispersion of image information, the shape of object image may be estimated at a high speed.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a flow chart for use in illustration of a three-dimensional modeling program recorded on the CD-ROM shown in FIG. 1;

FIG. 5 is an illustration showing visual points to shoot an object of interest in FIG. 4A;

FIG. 21 is a flow chart for use in illustration of details of the process of estimating a partial surface in a three-dimensional modeling apparatus according to a third embodiment of the invention;

DESCRIPTION OF THE PREFERRED EMBODIMENTS

Figure 1:
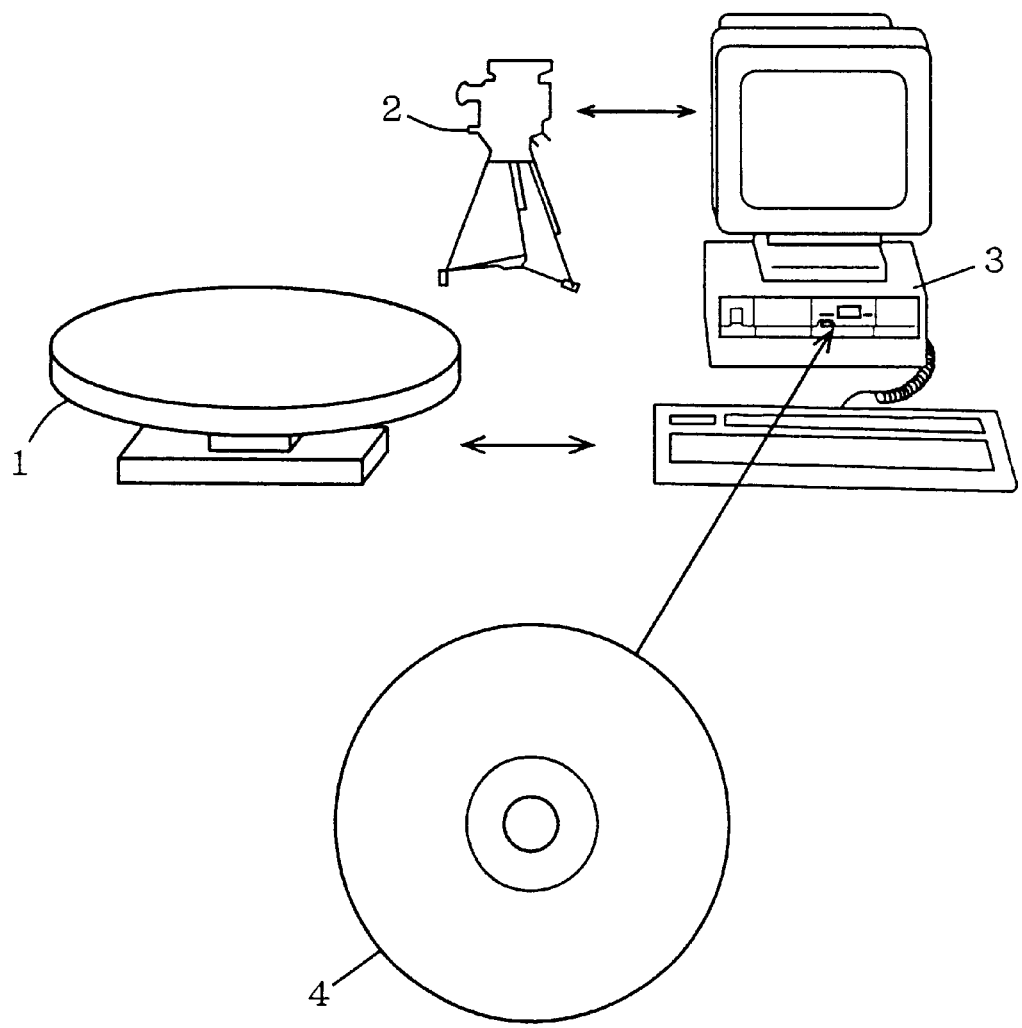
FIG. 1 is a diagram showing a general overview of a three-dimensional modeling apparatus according to a first embodiment of the invention.

Embodiments of the present invention will be now described in conjunction with the accompanying drawings, in which the same or corresponding portions are denoted with the same reference characters and the description thereof is not repeated.

First Embodiment

FIG. 1 is a general overview of a three-dimensional modeling apparatus according to a first embodiment of the invention. Referring to FIG. 1, the three-dimensional modeling apparatus according to the first embodiment includes a turntable 1, a digital still camera 2, a computer 3, and a CD-ROM (Compact Disk—Read Only Memory) 4. Turntable 1 is used to turn an object of interest (not shown) placed thereon. Although turntable 1 is used herein, a robot arm or the like capable of changing the direction of an object of interest may be used instead. Digital still camera 2 is used to shoot an object of interest to produce a three-dimensional model from a plurality of visual points and to obtain a plurality of object images. Although digital still camera 2 capable of taking still pictures is used herein, a video camera or the like capable of taking motion pictures may be used instead. CD-ROM 4 is recorded with programs to allow computer 3 to produce a three-dimensional model of an object of interest based on object images taken by digital still camera 2. Although CD-ROM 4 is used as a medium for recording such programs herein, a floppy disk, CD-R, DVD, memory card or the like may be used instead.

Note that the three-dimensional modeling apparatus shoots an object of interest from a plurality of visual points by turning the object while camera 2 is fixed, but the object may be fixed while camera 2 is moved to shoot the object from a plurality of visual points instead. Note however that if camera 2 is moved, the shooting positions of camera 2 should be produced. In the case of the three-dimensional modeling apparatus, camera 2 is fixed while the object of interest is turned, and the distance from each visual point to the object is equal, but the distance may not be necessarily equal. If the distance is not equal, various calculations are required in view of the distance from each visual point to the object according to the following method.

Figure 2:
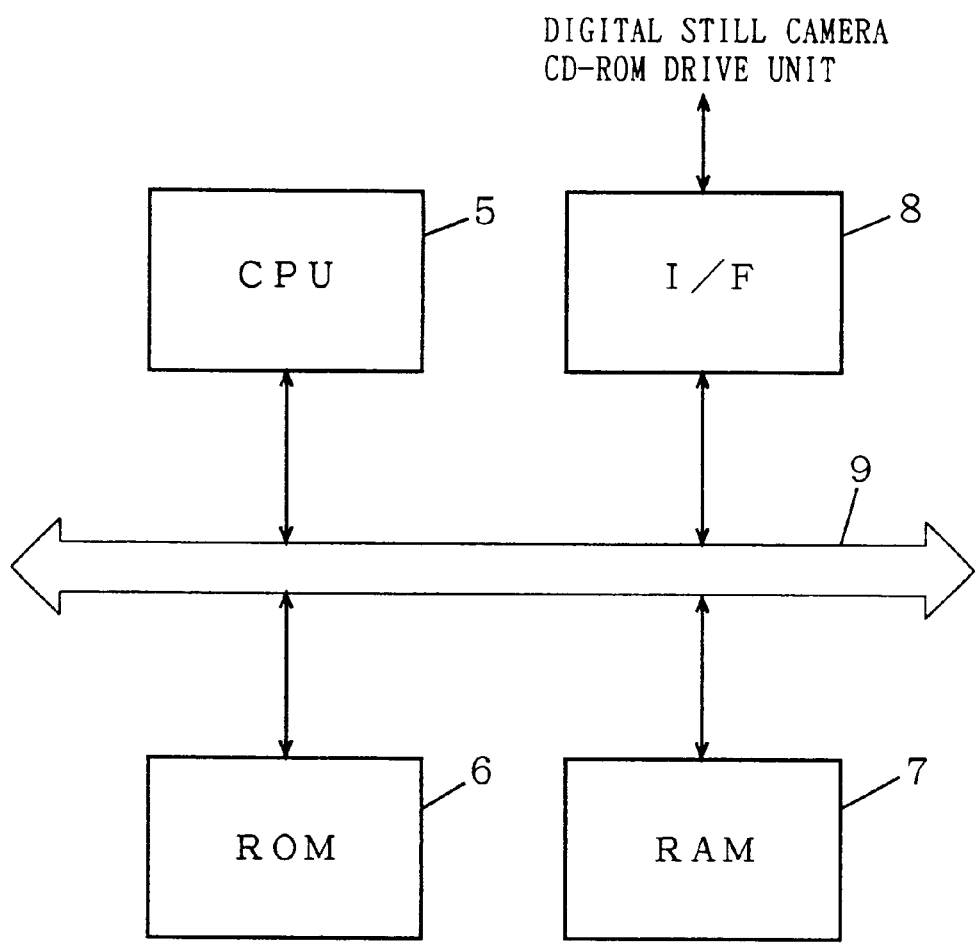
FIG. 2 is a block diagram showing a main part of the computer shown in FIG. 1.

FIG. 2 is a block diagram showing a main part of computer 3 shown in FIG. 1. Referring to FIG. 2, computer 3 includes a CPU (Central Processing Unit) 5, a ROM (Read Only Memory) 6, a RAM (Random Access Memory) 7, an I/F (input/output interface) 8, and a data/address bus 9 for coupling CPU 5, ROM 6, RAM 7 and I/F 8 to one another. Digital still camera 2 and a drive unit for CD-ROM 4 are connected to I/F 8, such that object images taken by digital still camera 2 and programs recorded on CD-ROM 4 are stored in RAM 7 through I/F 8. CPU 5 performs operations according to programs stored in ROM 6 and RAM 7.

Figure 4A:
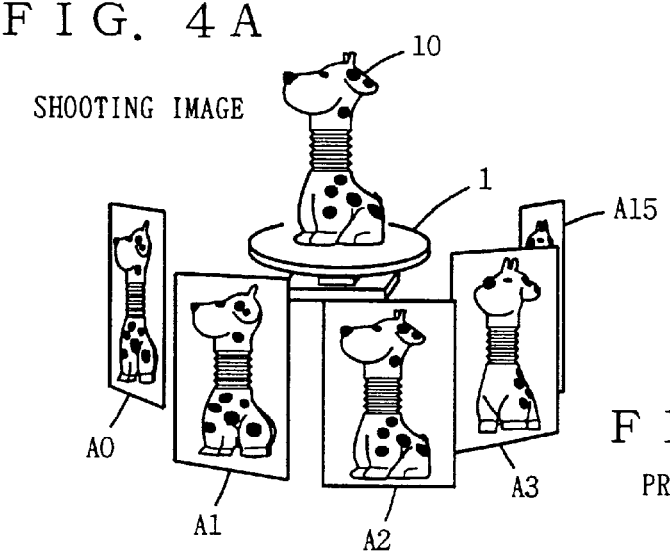
FIG. 4A is an illustration showing the step of shooting an object of interest and the background in FIG. 3.
Figure 4B:
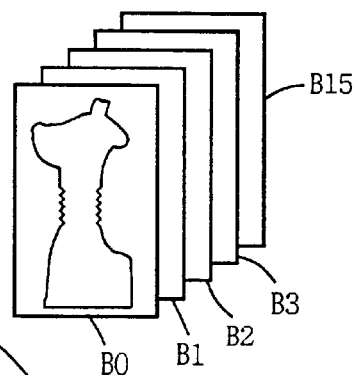
FIG. 4B is an illustration showing the step of producing silhouette images in FIG. 3.
Figure 4C:
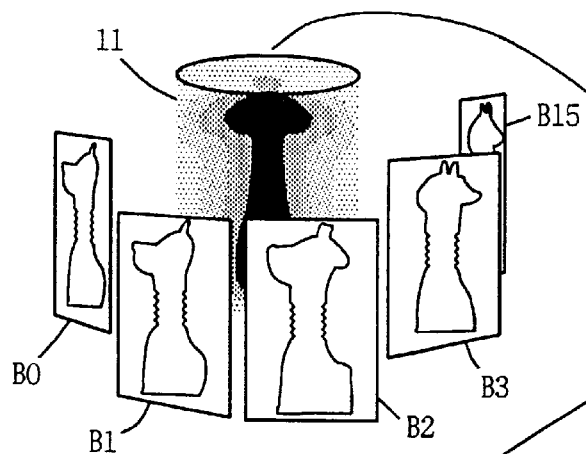
FIG. 4C is an illustration showing the step of estimating a shape in FIG. 3.
Figure 4D:
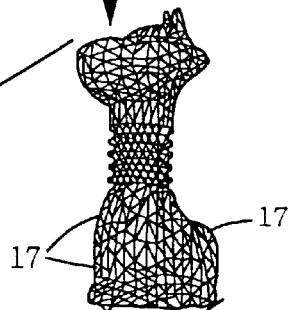
FIG. 4D is an illustration showing the step of producing a polygon in FIG. 3.
Figure 4E:
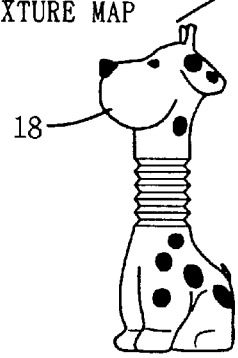
FIG. 4E is an illustration showing the step of texture mapping in FIG. 3.

FIG. 3 is a flow chart for use in illustration of a three-dimensional modeling program recorded on CD-ROM 4 shown in FIG. 1. FIG. 4A is an illustration showing the step S2 of shooting an object of interest and the background in FIG. 3. FIG. 4B is an illustration showing the step S3 of producing silhouette images in FIG. 3. FIG. 4C is an illustration showing the step S4 of estimating a shape in FIG. 3. FIG. 4D is an illustration showing the step S5 of producing a polygon in FIG. 3. FIG. 4E is an illustration showing the step S6 of texture mapping in FIG. 3.

Referring to FIGS. 1 to 4E, in step S1, calibration is performed to determine the relative positional relation between turntable 1 and camera 2.

Then in step S2, object of interest 10 and the background thereof are shot by camera 2. More specifically, first, only the background is shot from one visual point without placing object of interest 10 on turntable 1. Thus, one kind of background image results. Then, object of interest 10 is placed on turntable 1, which is then turned, while object of interest 10 is shot from a plurality of visual points. If, for example, turntable 1 is turned by 22.5°, object of interest 10 will be shot from 16 visual points (0–15) as shown in FIG. 5, 16 kinds of object images A0 to A15 are obtained. Turntable 1 and camera 2 are connected to I/F 8 in computer 3, and controlled by CPU 5. The thus obtained one kind of background image and 16 kinds of object images A0 to A1 are stored in RAM 7 through I/F 8. Note that although object of interest 10 is shot from the 16 visual points, the number of visual points is not particularly limited and may be two or more.

In step S3, silhouette images are produced according to a known image subtraction processing. More specifically, image subtraction processing is performed between object images A0 to A15 and the background image, and 16 silhouette images B0 to B15 are produced as shown in FIG. 4B. In the image subtraction processing, the difference between the color signal levels in the object images and the background image are calculated for each pixel. Note that although the image subtraction processing is employed herein, a well-known stereo method may be used instead. In the stereo method, object of interest 10 is shot by a binocular camera, and object of interest 10 and the background are discriminated based on depth information in the images.

Figure 6:
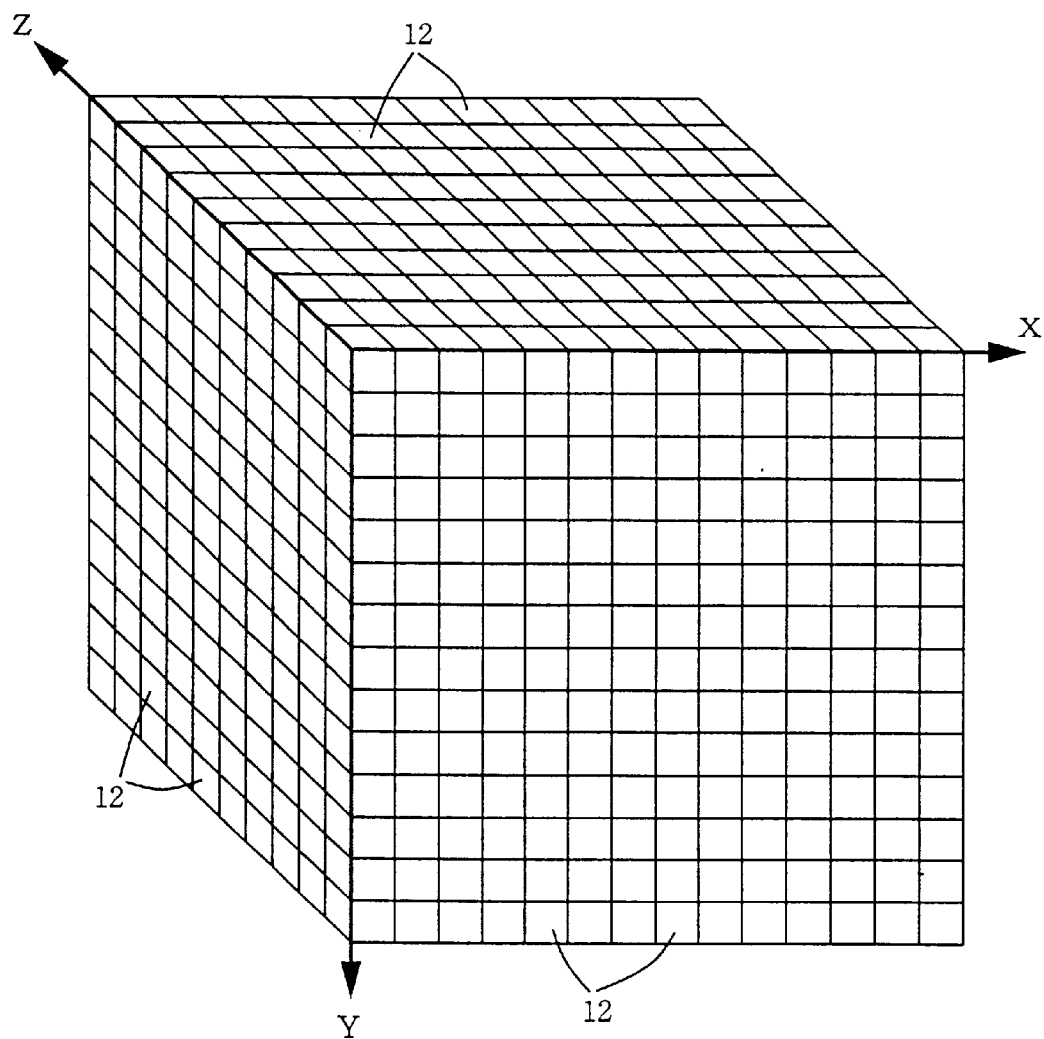
FIG. 6 is a conceptional view showing a Voxel space used in the process of estimating a shape in FIG. 4C.

Then in step S4, a shape estimation processing is performed. For the process, a Voxel space 11 in a rectangular coordinate system as shown in FIG. 6 is prepared and stored in RAM 7. Although Voxel space 11 in the rectangular coordinate system is used herein, a Voxel space in a cylindrical coordinate system may be used instead. Voxel space 11 is formed by a plurality of Voxels 12.

Figure 7:
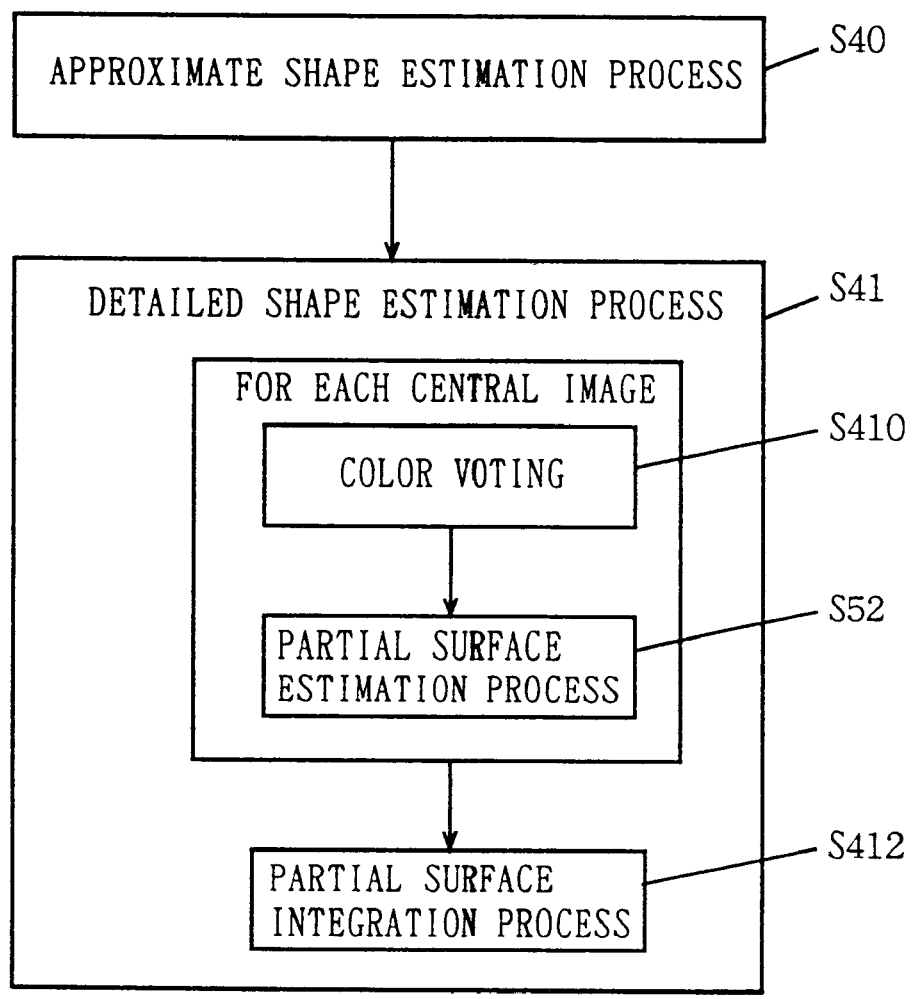
FIG. 7 is a flow chart for use in illustration of details of the step of estimating a shape shown in FIG. 3.

FIG. 7 is a flow chart for use in illustration of details of the step S4 of estimating a shape shown in FIG. 3. In the approximate shape estimation process in step S40, the presence region of object of interest 10 in Voxel space 11 is approximately estimated based on the plurality of silhouette images B1 to B15. Then in the process of detailed shape estimation in step S41, the shape of object of interest 10 is estimated in more detail based on standard deviation in density information (luminance signal levels) among object images A0 to A15.

Figure 8:
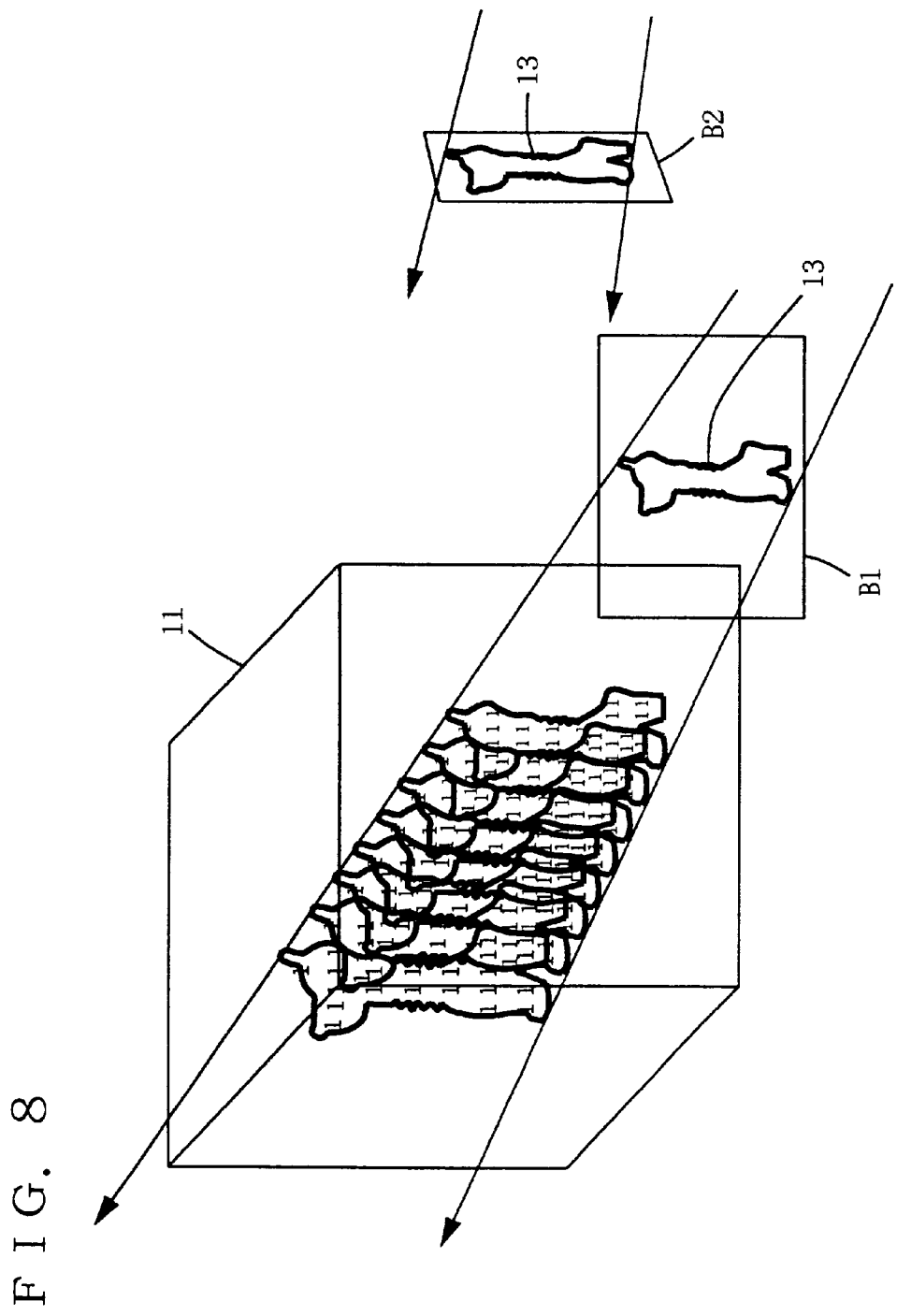
FIG. 8 is an illustration showing the step of estimating an approximate shape shown in FIG. 7.

In the step S40 of approximately estimating the presence region of object of interest 10, a well-known voting process is performed. More specifically, as shown in FIG. 8, silhouette images B1 and B2 are projected in Voxel space 11 fiom respective visual points. At this time, one point is voted for the possibility of object of interest 10 being present in Voxel 12 through which a part of object 13 in silhouette images B1 and B2 passes. When all the silhouette images B1 to B15 have been projected in Voxel space 11, Voxel 12 having votes more than a prescribed number is estimated as the presence region of object of interest 10. Note however that the recessed part 14 of object of interest 10 as shown in FIG. 5 does not appear in silhouette images B0 to B15, the presence region estimated by the voting process only approximately expresses the shape of object of interest 10. In other words, the true surface of the recessed part 14 of object of interest 10 does not appear, or a provisional surface 15 appears. The true surface 14 of object of interest 10 is usually viewed in the same color and density from any of the visual points, but provisional surface 15 is viewed in different colors or densities among the visual points. Therefore a part of the same portion viewed in a different color or density from the other part is likely to be a recessed part of object of interest 10.

In the step S4 of estimating the shape of object of interest 10 in detail, after approximately estimating the shape of object of interest 10, the shape of object of interest 10, particularly the shape of the recessed part is estimated in detail based on standard deviation in the density information.

More specifically, if the shape is estimated using object image A0 as the central image, and object images A1 and A15 adjacent to object image A0 as peripheral images, among the 16 object images A0 to A15, the density information of the pixels are projected together with object images A0, A1 and A15 in Voxel space 11, and the density information of each pixel is accumulated in all the Voxels 12 through which projection lines 16 from the pixels penetrate (color voting process in step S410). Stated differently, projection points to object images A0, A1, and A15 are produced for all the Voxels 12, and the density information of the projection point is accumulated in a corresponding Voxel 12. Then, the standard deviation in the density information accumulated in each Voxel 12 is calculated. If a Voxel 12 has a large standard deviation, a corresponding part is viewed in different densities between visual points, and such Voxel 12 is highly likely to be a recessed part of object of interest 10. Therefore, by smoothly coupling Voxels with small standard deviation among Voxels 12 in Voxel space 11, a partial surface of object of interest 10 which can be viewed from visual point (0) shown in FIG. 5 may be estimated (the partial surface estimation process in step S52).

The step S410 of color voting and the step S52 of estimating a partial surface as described above are performed using each of object images A0 to A15 as the central image. Thus, the estimated 16 kinds of partial surfaces are integrated, and a three-dimensional shape of object of interest 10 is obtained (the process of integrating partial surfaces in step S412).

In step S5 following step S4, a polygon 17 formed by triangular patches is produced based on the three-dimensional shape of object of interest 10 obtained in step S4. As a result, the three-dimensional shape of object of interest 10 is expressed by a number of polygons. The three-dimensional shape expressed by polygons 17 is stored in RAM 7.

Finally, in step S6, texture corresponding to each polygon 17 produced in step S5 is mapped. Thus, a three-dimensional model 18 modeled after object of interest 10 is produced. The texture is color information obtained from object images A0 to A15 and stored in RAM 9.

Note that although object of interest 10 is shot from a plurality of visual points using turntable 1 to obtain the plurality of object images A0 to A15, the above steps S1 to S3 may be replaced with other known methods as desired, as long as object images necessary for estimating the three-dimensional shape of object of interest 10 may be obtained. Furthermore, as long as three-dimensional model 18 may be produced based on object images and an estimated three-dimensional shape, the above-described steps S5 and S6 may be replaced with other known methods as desired. As far as the presence region of object of interest 10 in Voxel space 11 may be approximately estimated based on the contour of object of interest 10, the process in the first half of step S4 may be replaced with other methods as desired.

A method of producing the three-dimensional model 18 of object of interest 10 using the thus formed three-dimensional modeling apparatus will be now described.

After the calibration as described above in step S1, the background is shot from a single visual point in step S2, and object of interest 10 is shot fiom a plurality of visual points. Thus, a single background image and a plurality of object images A0 to A15 are obtained. In step S3, difference image processing is performed among object images A0 to A15 and the background image, and silhouette images B0 to B15 are obtained as a result.

Figure 10:
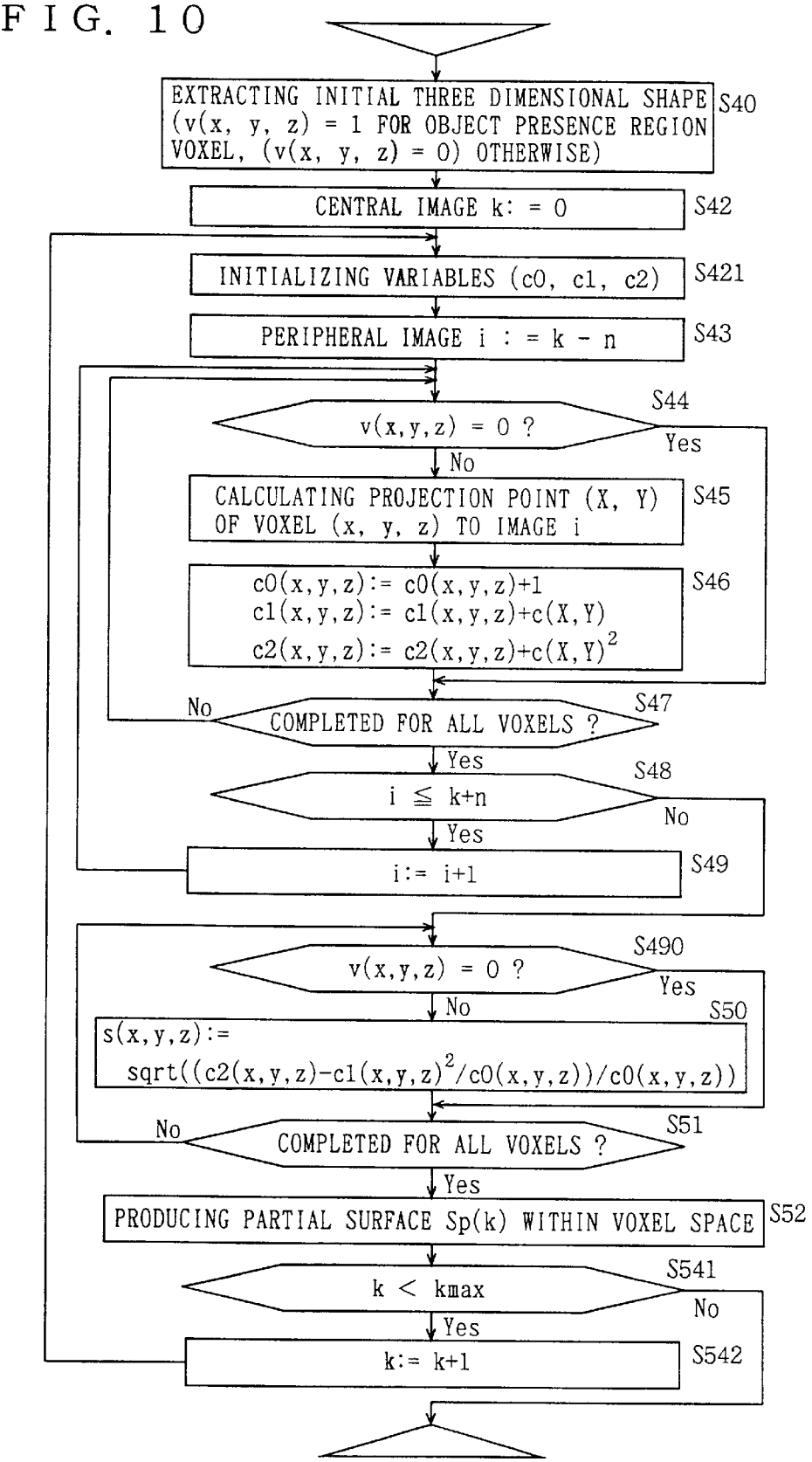
FIG. 10 is a flow chart for use in illustration of details of the steps of estimating an approximate shape, color voting and partial surface estimation shown in FIG. 7.
Figure 11:
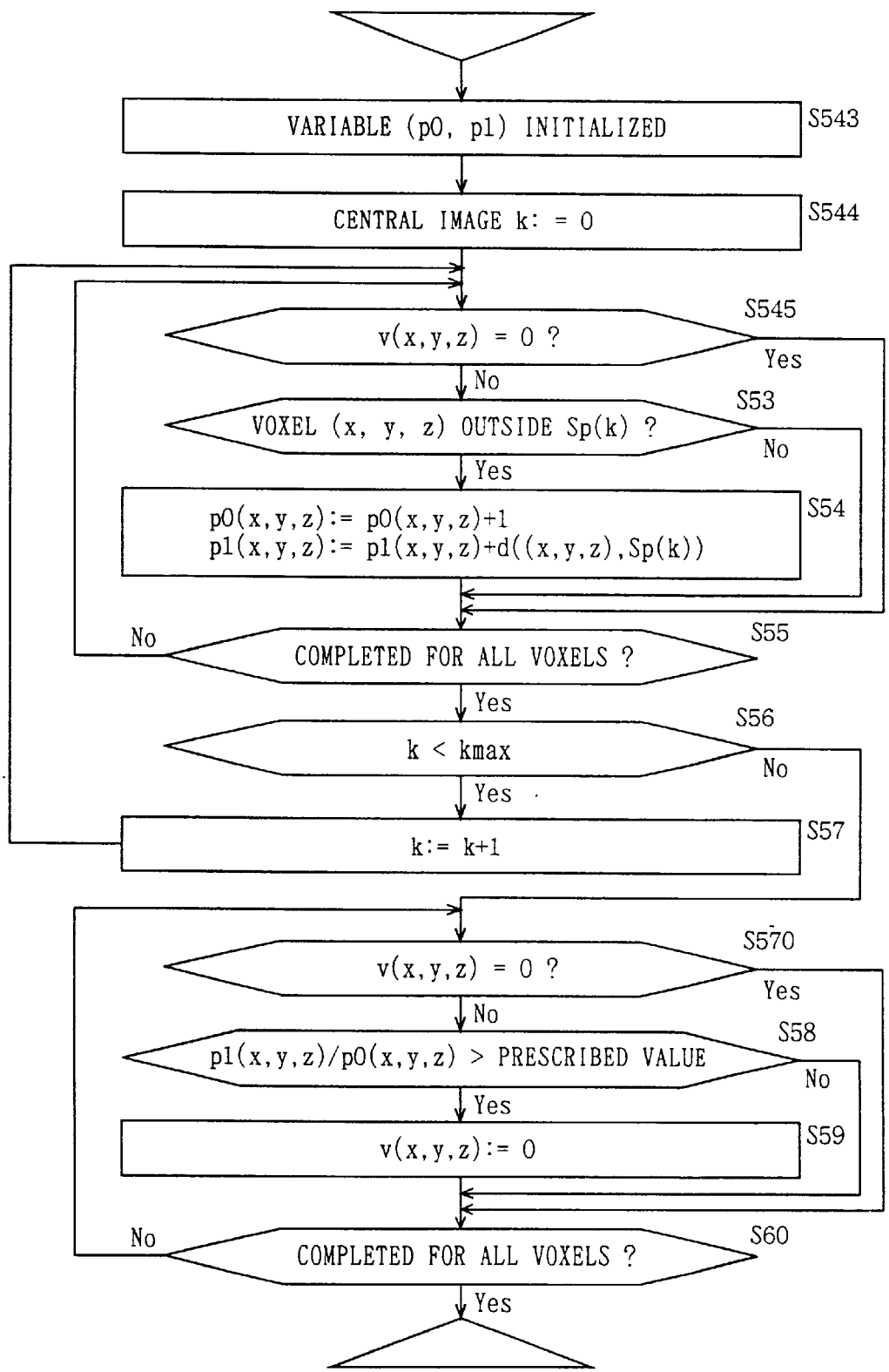
FIG. 11 is a flow chart for use in illustration of details of the step of integrating partial surfaces shown in FIG. 7.

Subsequently, in step S40, the process of estimating an approximate shape such as voting is performed based on silhouette images B0 to B15, and then in step S41, the process of estimating a detailed shape is performed based on density information on object images A0 to A15. FIG. 10 is a flow chart showing details of the process of approximate shape estimation in step S40, the process of color voting in step S410 and the process of partial surface estimation in step S52 shown in FIG. 7. Note that steps S421 to S51 in FIG. 10 correspond to the color voting process in step S410 in FIG. 7. FIG. 11 is a flow chart showing details of the process of partial surface integration in step S412.

In step S40, the process of approximate shape estimation such as voting as described above is performed based on silhouette images B0 to B15, and an approximate initial three-dimensional shape of object of interest 10 is extracted.

More specifically, a Voxel (x, y, z), the voting number of which is larger than a prescribed number, is estimated as the presence region of object of interest 10, and the presence/absence variable v (x, y, z) of the Voxel is set to "1". Meanwhile, a Voxel (x, y, z), the voting number of which is smaller than the prescribed value, is not estimated as the presence region of object of interest 10, and the presence/absence variable v (x, y, z) of the Voxel is set to "0". Thus, an approximate presence region of object of interest 10 is formed by a Voxel where v (x, y, z)=1.

Subsequently, in S42, an object image obtained by shooting object of interest 10 from visual point (0) shown in FIG. 5 is selected as central image k.

Then in step S421, variable (c0, c1, c2) is initialized.

Then in step S43, an object image obtained by shooting object of interest 10 from a visual point (16−n ("16" corresponds to "0" in FIG. 5)) which is n points apart clockwise in FIG. 5 from central image k(=0) is selected as a peripheral image i. If, for example, n=2, an object image (peripheral image) A14 obtained by shooting object of interest 10 from visual point (14) in FIG. 5 is selected.

Figure 12:
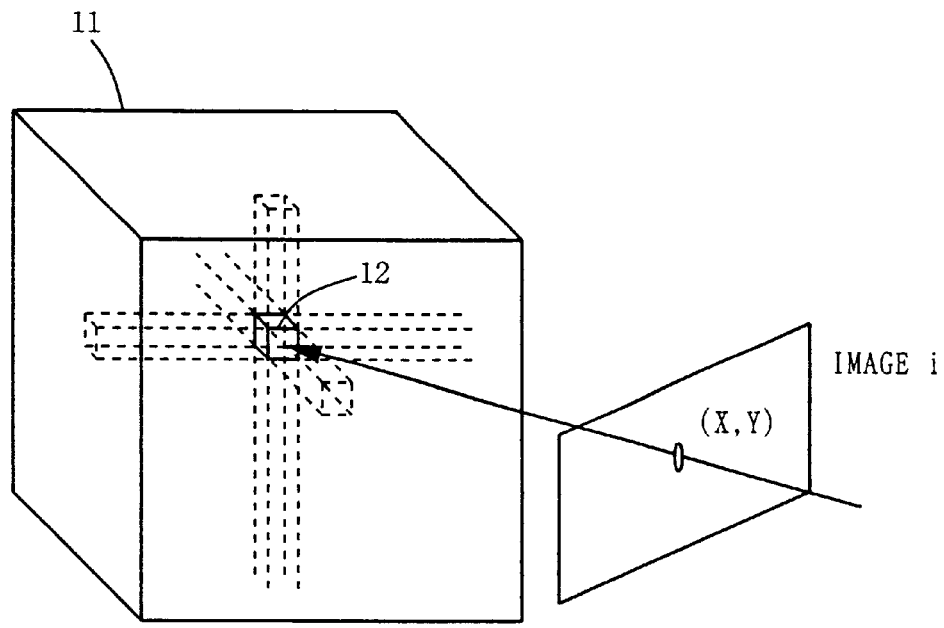
FIG. 12 is an illustration showing a projection point used in step S45 in FIG. 10.

Subsequently in step S44, whether or not v(x, y, z) is "0", in other words whether or not Voxel (x, y, z) is the presence region of object of interest 10 is determined. If v(x, y, z)≠0, in other words if v(x, y, z)=1, a projection point (X, Y) to image i (i=14 herein) of Voxel 12 positioned at coordinates (x, y, z) as shown in FIG. 12 is calculated.

Then in step S46, values necessary for calculating standard deviation s(x, y, z) in step S50 is calculated. More specifically, the number of pieces of density information accumulated in Voxel 12 by incrementing variable c0 (x, y, z) is counted. Variable c1(x, y, z) is added with the density information c(X, Y) of a pixel positioned at projection point (X, Y). Variable c2(x, y, z) is added with the square of the density information $c(X, Y)^2$. Note that if v(x, y, z)=0 in step S44, the process in steps S45 and S46 will not be performed.

Then in step S47, whether or not all the processes in steps S44 to S46 have been performed for all the Voxels is determined. If the process in steps S44 to S46 has not been performed to all the Voxels, variables c1(x, y, z) and c2(x, y, z) of each Voxel in the presence region of object of interest 10 are once again added with the density information c(X, Y) of a corresponding projection point (X, Y) in image i(=14) and the square thereof $C(X, y)^2$.

If the process in steps S44 to S46 has been performed to all the Voxels, it is determined in step S48 if the process in steps S44 to S47 has been performed to central image k(=0) and all the peripheral images i(=14, 15, 1, 2). The process in steps S44 to S47 has been simply performed to peripheral image i(=14) for the first time, but variable i is incremented in step S49, and peripheral image i of interest is changed from i=14 to i=15. Accordingly, as is the case with the above, the density information c(X, Y) of a corresponding projection point (X, Y) in peripheral image (=15) and its square $c(X, Y)^2$ are accumulated in Voxel 12 in the presence region of object of interest.

If the value of variable i exceeds the value of the variable (k+n) (=2 herein), it shows that the density information on central image k(=0) and the peripheral images i(=14, 15, 1, 2) have been all accumulated in Voxel 12 within the presence region of object of interest.

If it is determined in step S48 that the value of variable i is larger than the value of variable (k+n), it is determined in step S490 if the presence/absence variable v(x, y, z) is "0", in other words if that Voxel (x, y, z) is the presence region of object of interest 10 is determined. If v(x, y, z)≠0, in other words if v(x, y, z)=1, the standard deviation s(x, y, z) of density information accumulated in each Voxel 12 is calculated based on c0, c1 and C2 calculated in step S46.

Then in step S51, it is determined whether or not standard deviation s(x, y, z) has been calculated for all the Voxels.

If standard deviation x(x, y, z) has been calculated for all the Voxels, a partial surface Sp(k) of object of interest 10 viewed from each visual point (0–15) in Voxel space 11 is estimated in step S52. As stated above, the standard deviation s(x, y, z) of a Voxel positioned in a recessed part 14 of object of interest 10 is generally large, and the standard deviation s(x, y, z) of a Voxel positioned on the surface of object of interest 10 is small. As a result, among Voxels having the same xy coordinates, Voxels having the minimum standard deviation x(x, y, z) are coupled to estimate the surface of object of interest 10. If, however, the illumination conditions change or the same color continues on the surface of recessed part 14, the standard deviation x(x, y, z) of a Voxel not positioned on the surface of object of interest 10 is sometimes influenced by noises and takes a minimum value. As a result, simply coupling Voxels with the minimum standard deviation s(x, y, z) does not necessarily result in accurate estimation of the shape.

Therefore, the shape of object of interest is desirably estimated taking into account the continuity of the shape to be estimated as well as standard deviation s(x, y, z). More specifically, the energy function (evaluation function), where standard deviation x(x, y, z) and the distance between adjacent Voxels are variables, is defined, and assuming that Voxels, where the value of the energy function is minimum, are positioned on the surface of object of interest 10, and a surface formed by these Voxels is a partial surface Sp(k). The method will be hereinafter referred to as "energy minimization method". Note that the energy function may take, as variables, standard deviation s(x, y, z) and the difference between the inclinations of adjacent Voxel spaces and corresponding surfaces in an approximate shape. Such partial surfaces are estimated for example by means of a dynamic programming (DP) method, relaxation method or the like. The dynamic programming method will be described in detail in conjunction with FIG. 13.

As stated above, partial surface Sp(k) is estimated as a surface candidate for object of interest 10 based on central image k(=0) and peripheral images i(=14, 15, 1, 2), and partial surface Sp(k) is estimated as a surface candidate for object of interest 10 similarly when each image from other visual points (1 to 15) is used as the central image (S541, S542). Therefore, the thus calculated plurality of partial surfaces Sp(k) should be integrated to determine the true surface of object of interest 10.

A Voxel positioned within the presence region of object of interest 10 initially approximately estimated in step S40 and positioned inside partial surface Sp(k) calculated in step S52 is highly likely to be the true presence region of object of interest 10. Meanwhile, a Voxel positioned inside the resence region of object of interest 10 approximately estimated in step S40 and outside partial surface Sp(k) calculated in step S52 may not be the true presence region of object of interest 10. The likelihood is higher for Voxels further from partial surface Sp(k) estimated in step S52. Therefore, each Voxel positioned outside partial surface Sp(k) is provided, as a penalty, with the distance to partial surface Sp(k) therefrom. Voxels having a penalty average value larger than a prescribed value is determined as a region other than the presence region of object of interest 10.

More specifically, as shown in FIG. 11, variables (p1, p1) are initialized in step S543, and then step S544, object image A0 obtained by shooting object of interest 10 from visual point (0) shown in FIG. 5 is selected as central image k. Subsequently, whether or not the presence/absence variable v(x, y, z) is "0" is determined in step S545, in other words, it is determined if the Voxel (x, y, z) is the presence region of object of interest 10. If v(x, y, z)≠0, in other words, if v(x, y, z)=1, it is determined in step S53 if the Voxel (x, y, z) is positioned outside partial surface Sp(k) calculated in step S52.

If the Voxel is positioned outside, variable p0(x, y, z) is incremented (S54). Thus, the number of penalties applied to the Voxel (x, y, z) is counted. Variable p1(x, y, z) is added with distance d((x, y, z), Sp(k) (S54). Distance d((x, y, z), Sp(k)) is the distance from the Voxel (x, y, z) to the partial surface Sp(k) of object of interest 10 estimated in step S54. Thus, Voxels further from partial surface Sp(k) are provided with greater penalty.

It is determined in step S55 if the process in steps S53 and S54 has been executed for all the Voxels. If the process has been executed for all the Voxels, it is then determined in step S56 if the process in steps S43 to S55 has been executed using images shot from all the visual points (0 to 15) shown in FIG. 5 as the central image, in other words, it is determined if variable k has reached the maximum value kmax (15 herein). If variable k is smaller than maximum value kmax, variable k is incremented in step S57, and the process in steps S53 to S55 is repeated.

Meanwhile, if variable k is not smaller than maximum value kmax, it is determined in step S570 if the presence/absence variable v(x, y, z) is "0", in other words, it is determined if the Voxel (x, y, z) is the presence region of object of interest 10. If v(x, y, z)≠0, in other words, if v(x, y, z)=1, it is determined in steps S58 to S60 that the Voxel with high penalty (x, y, z) is not the presence region of object of interest 10. More specifically, it is determined if the average value p1(x, y, z)/p0(x, y, z) of penalties applied to each of the Voxels (x, y, z) in step S58 is greater than a prescribed value. Herein, p0(x, y, z) is the number of penalties applied to Voxel (x, y, z).

If the average penalty value p1(x, y, z)/p0(x, y, z) is greater than a prescribed value, the presence/absence variable v(x, y, z) is set to 0 in step S59. If the average value p1(x, y, z)/p0(x, y, z) is not greater than the prescribed value, the process in step S59 is not executed.

It is then determined in step S60 if the process in steps S58 and S59 has been executed to all the Voxels. As a result, Voxels having average value p1(x, y, z)/p0(x, y, z) larger than the prescribed value are excluded from the presence region of object of interest 10. Thus, a plurality of partial surfaces Sp(k) are integrated to express the recessed part of object of interest 10. The method of integrating partial surfaces Sp(k) shown in FIG. 11 will be hereinafter referred to as "distance penalty method".

Based on object images A0 to A15 and the shape of object of interest 10 thus obtained, a polygon 17 is produced in step S5 shown in FIG. 3, and texture is mapped in step SG. Thus, a three-dimensional model 18 of object of interest 10 is produced.

Figure 14:
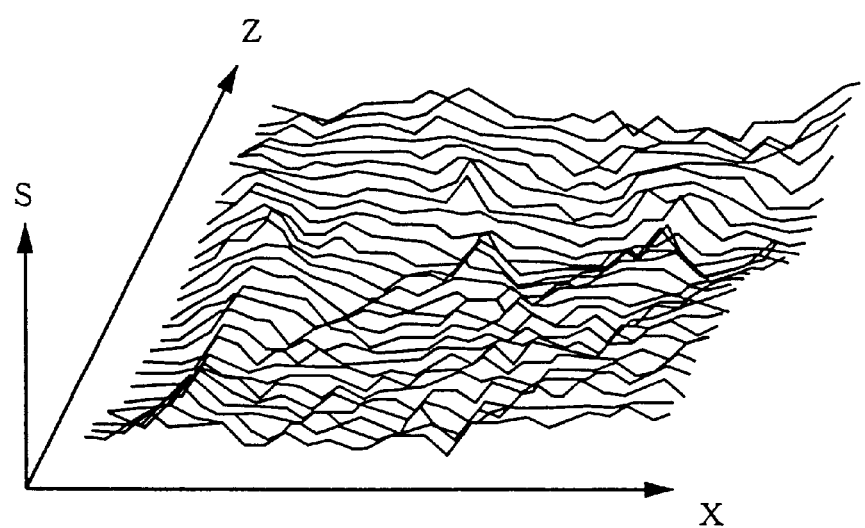
FIG. 14 is a bird's-eye view showing a standard deviation in the Y=y0 plane calculated according to the flow chart in FIG. 10.
Figure 13:
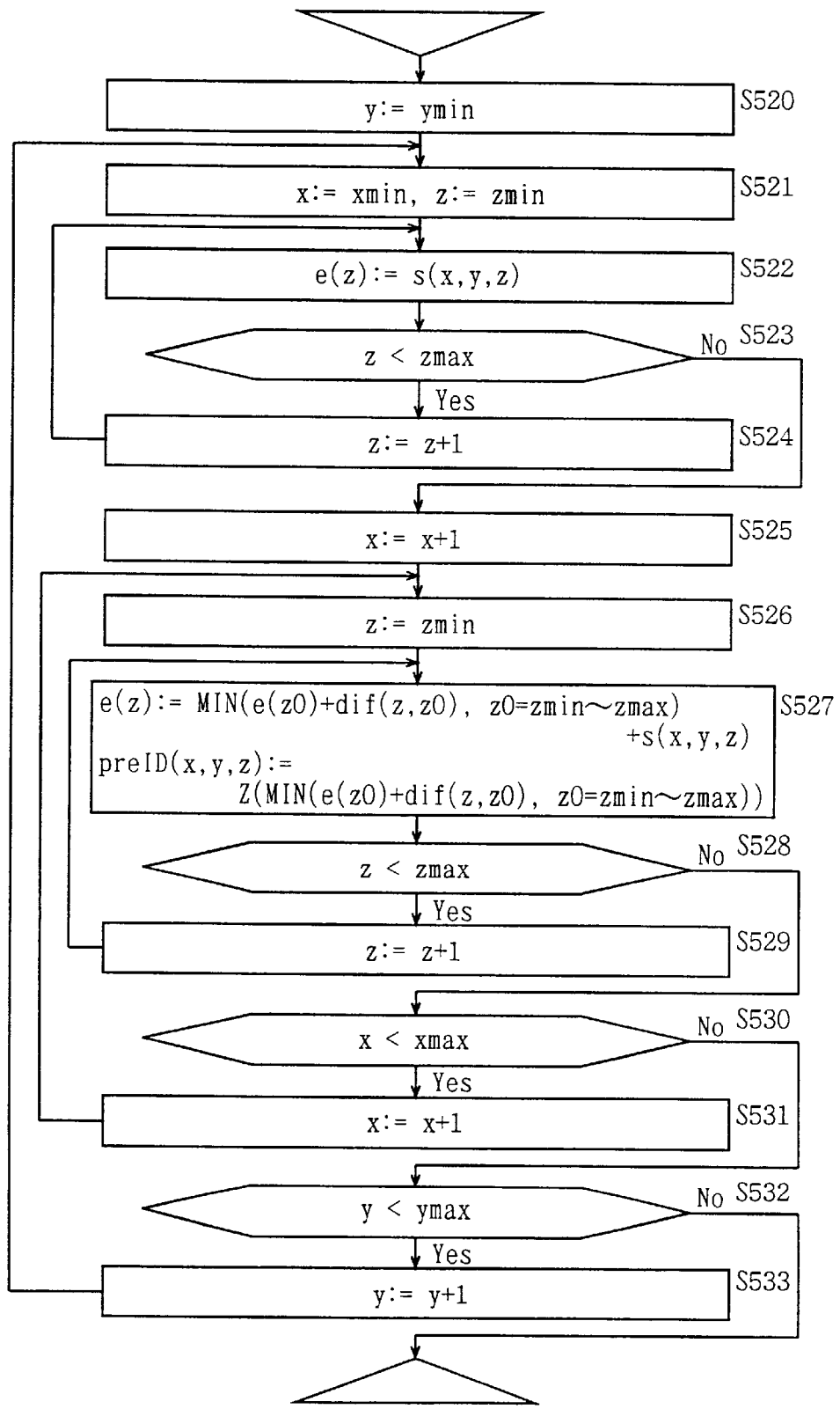
FIG. 13 is a flow chart for use in illustration of a dynamic programming method used in step S52 in FIG. 10.
Figure 15:
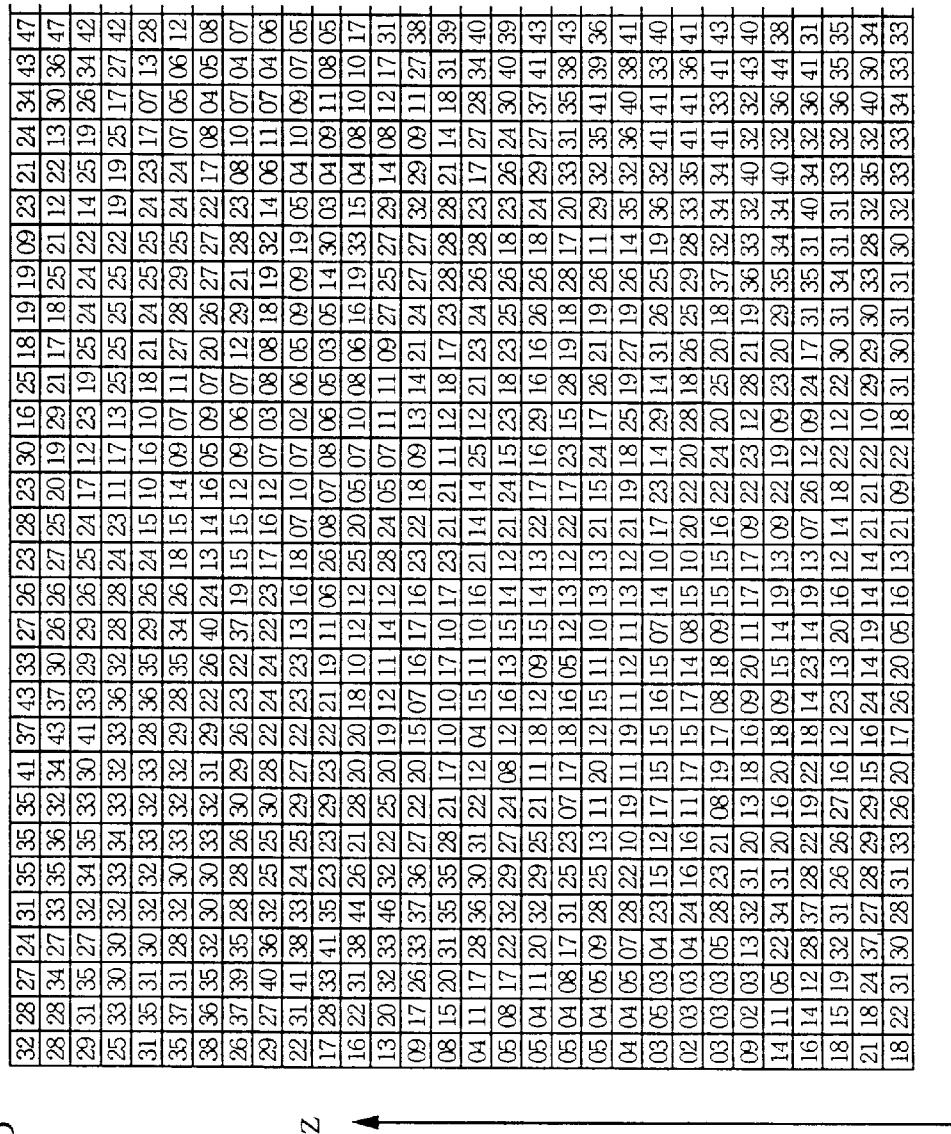
FIG. 15 shows the values of standard deviations in the Y=y0 plane calculated according to the flow chart shown in FIG. 10.

FIG. 13 is a flow chart for use in illustration of a method of calculating partial surface Sp(k) by means of dynamic programming in step S52 shown in FIG. 10. Although not shown, prior to the process in FIG. 13, Voxel spaces are desirably subjected to coordinate transformation based on central image k shown in FIG. 22 as will be described. FIG. 14 is a bird's-eye view showing standard deviation s in the Y=y0 plane calculated according to the flow charts shown in FIG. 10 and 11. FIG. 15 shows the standard deviations s of Voxels within Y=y0 plane in Voxel space 11. In the dynamic programming method shown in FIG. 13, parts with standard deviations s as small as possible are coupled while maintaining the smoothness in FIGS. 14 and 15.

Referring to FIG. 13, the minimum value ymin is set at coordinate y in step S520, then the minimum value xmin is set at x in step S521, and the minimum value zmin is set at coordinate z.

Then in steps S522 to S524, the standard deviations s(x, y, z) of Voxels in the column at X=xmin (the leftmost column in FIG. 15) are set as initial values for an array e(z) for provisional energy function values.

Subsequently, in step S525, x is incremented, and in step S526, coordinate z is set to the minimum value zmin.

Then in steps S527 to S529, the energy function of the column at X=xmin+1 is calculated. In step S527, MIN(e (z0)+dif(z, z0), z0=zmin to zmax) is the smallest (min) among evaluation values (e(z0)+dif(z, z0)), assuming the surface of object of interest 10 to be produced is coordinate z, and that the surface at coordinate x−1 is coordinate z0 (z0 is any of zmin to zmax). Dif(z, z0) is for example the distance from coordinate z in surface x to coordinate z0 in surface x−1. Alternatively, dif (z, z0) is the difference between the inclination fiom coordinate z in surface x to coordinate z0 in surface x−1 and the inclination from coordinate z' in approximate surface x to coordinate z0' in approximate surface x−1. MIN(e(z0)+dif(z, z0)) is added with the standard deviation s(x, y, z) of each Voxel in the column at X=xmin+1, such that a provisional energy function value e(z) is calculated for each Voxel.

The value of coordinate z(0) which gives the minimum value min is set for variable preID(x, y, z). At X=xmin+1, coordinates z at coordinate x−1 for minimizing the provisional energy function values e(z), assuming that the value at coordinate z is z, are stored.

Figure 16:
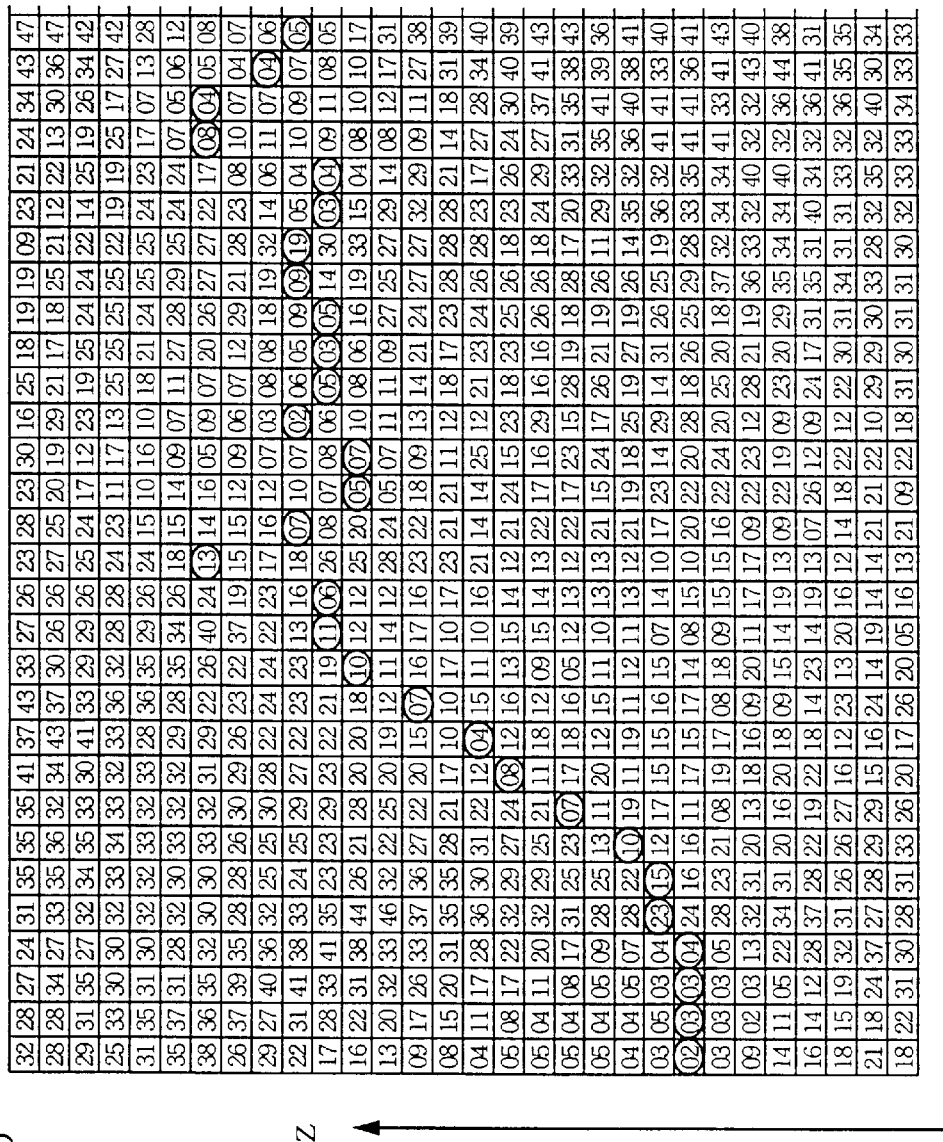
FIG. 16 shows partial surfaces determined according to the flow chart in FIG. 13.

Subsequently, in steps S530 and S531, the process in steps S527 to S529 described above is executed for the z coordinate column corresponding to all the coordinates x in the range fiom xmin to xmax−1. Therefore, energy function e(z) stores the minimum energy function value for each z for xmin to the present coordinate x As a result, the coordinate z that gives the minimum value in the calculated energy function e(z) is produced. Coordinate z represents the position of the surface of object of interest 10 in the column at xmax−1. Herein, in view of variable preID(x, y, z), the z coordinate in the surface at coordinate x−1, i.e., one coordinate before the present is recorded. As a result, coordinate x is sequentially decremented, and replaced for variable preID(x, y, z), the position of the surface of object of interest 10 may be traced in the −X-direction. The thus calculated partial surface Sp(k) is shown in FIG. 16. As can be seen from FIG. 16, the standard deviation of a Voxel determined to be partial surface Sp(k) is not necessarily the minimum in each column. If such a Voxel having the minimum standard deviation in each column is selected as forming partial surface Sp(k), the continuity of partial surfaces Sp(k) is lowered. Herein, Voxels forming a surface are selected in view of the continuity of partial surfaces Sp(k).

Then in steps S532 and S533, the process in steps S521 to S531 as described above is executed to all the coordinates y at ymin to ymax.

Figure 17:
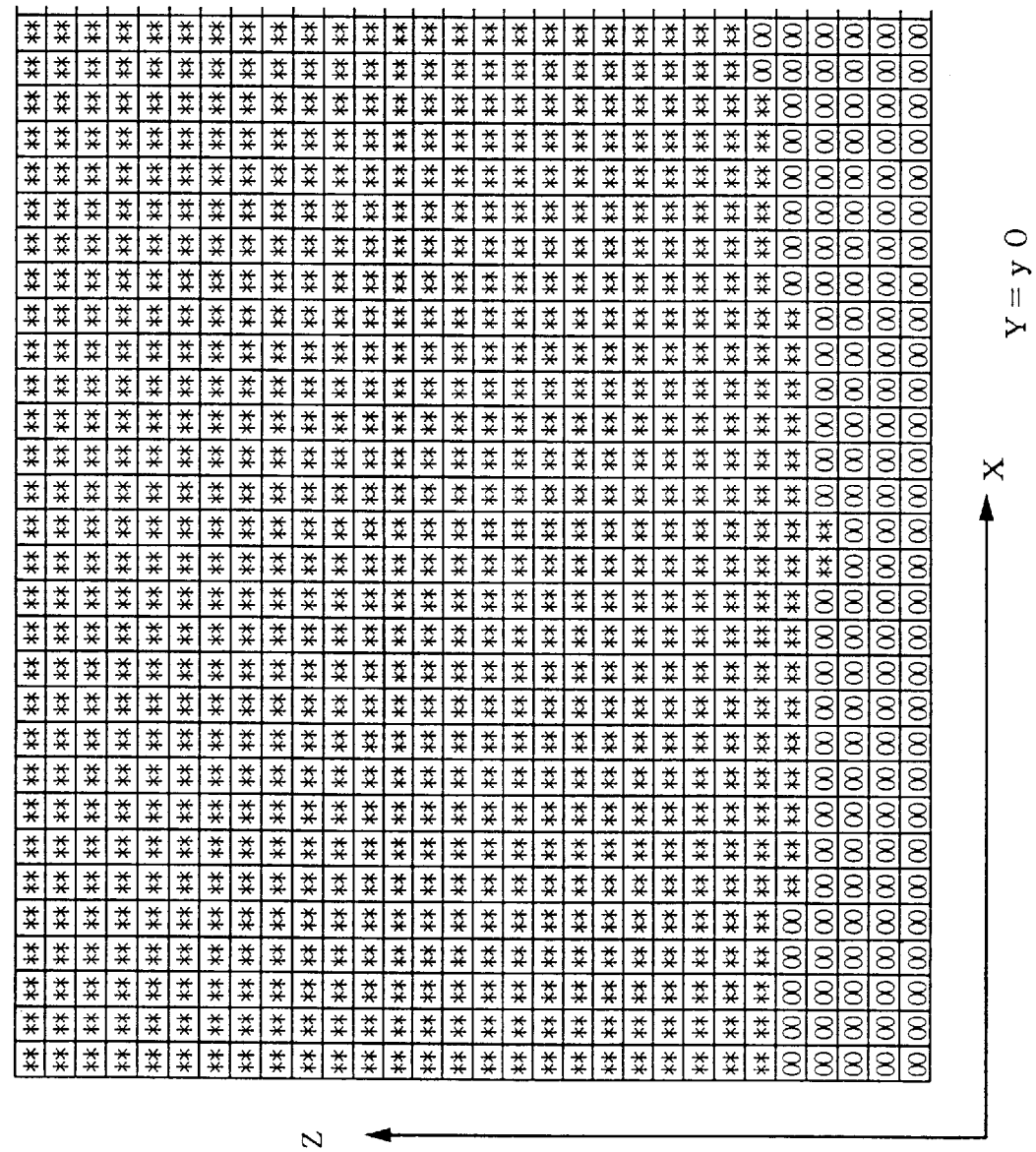
FIG. 17 shows the initial shape of the presence region of an object of interest obtained in step S40 in FIG. 10.

FIG. 17 shows Voxels in the initial Y=y0 plane obtained in step S40 shown in FIG. 10. Voxels represented by "**" in FIG. 17 are positioned in the approximate presence region of object of interest 10. In step S54 shown in FIG. 11, each Voxel is inside object of interest 10, but in FIG. 16, the distance d((x, y, z), Sp(k)) from each Voxel outside to the partial surface Sp(k) of object of interest 10 is calculated.

As described above, in the first embodiment, the shape of object of interest 10 is estimated based on standard deviations in the density information between object images A0 to A15, three-dimensional model 18 expressing a recessed part of object of interest 10 may be produced.

Before estimating the shape of object of interest 10 based on standard deviations, the presence region of object of interest 10 is approximately estimated by voting process based on silhouette images P0 to P15, the three-dimensional model 18 of object of interest 10 may be quickly produced.

Furthermore, since Voxels with small standard deviations are coupled to estimate the surface of object of interest, accurate three-dimensional model 18 may be stably produced if illumination conditions or the like change.

Second Embodiment

Figure 18:
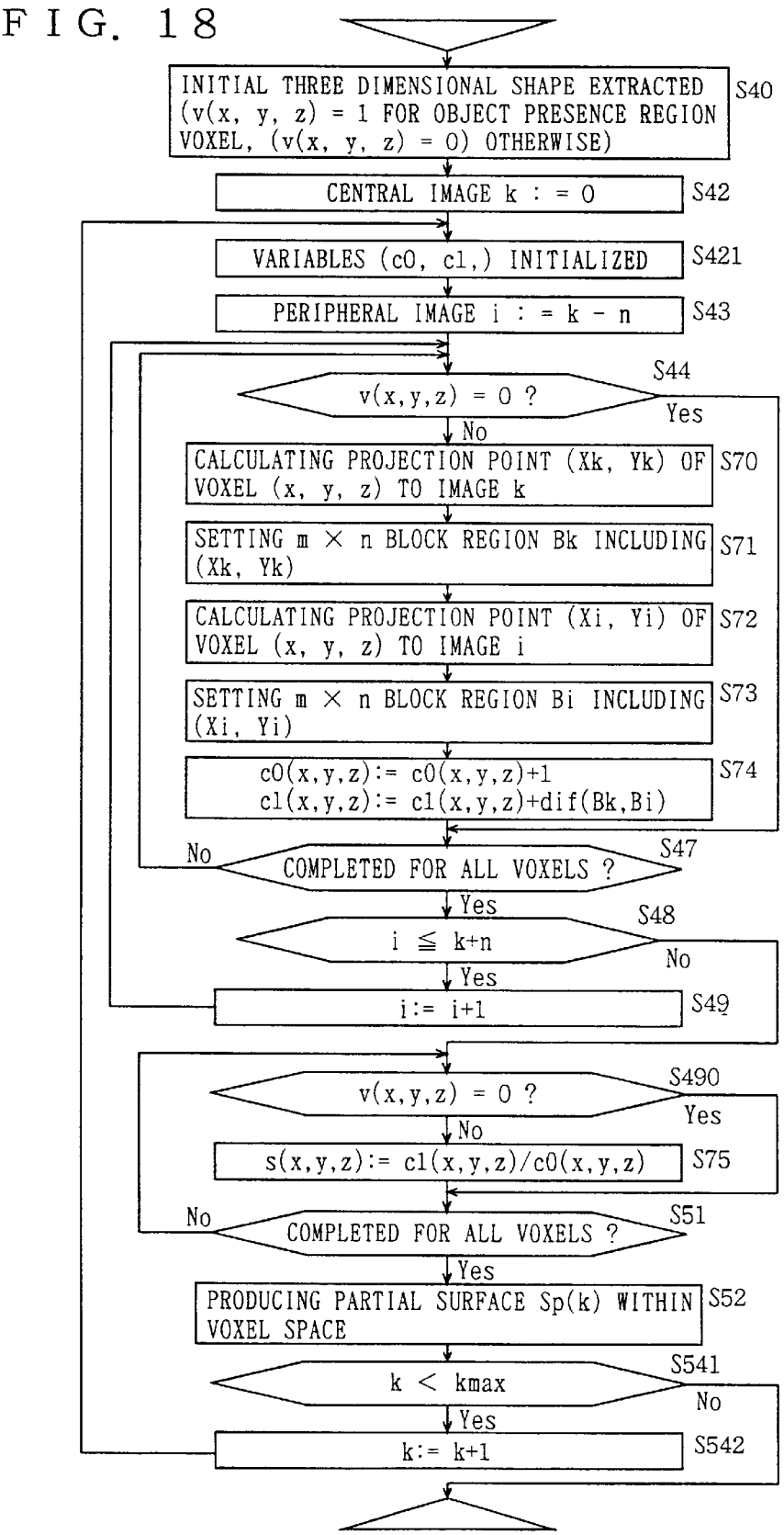
FIG. 18 is a flow chart for use in illustration of the process of estimating a shape in a three-dimensional modeling apparatus according to a second embodiment of the invention.
Figure 19:
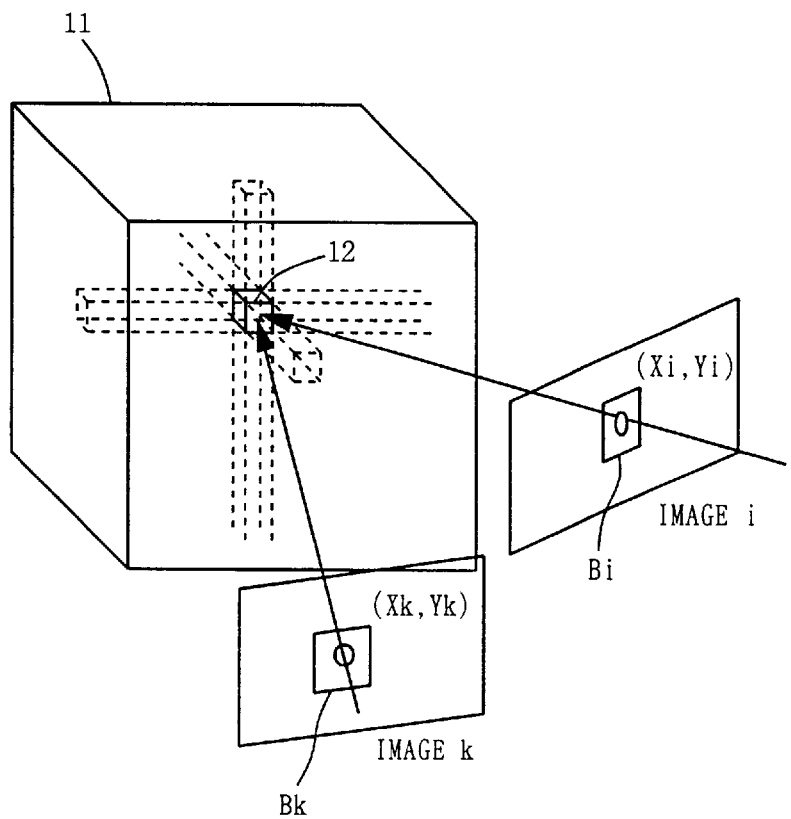
FIG. 19 is an illustration showing projection points used in steps S70 and S72 in FIG. 17.

FIG. 18 is a flow chart for use in illustration of the shape estimation process (excluding partial surface integration process) in a three-dimensional modeling apparatus according to a second embodiment of the invention. In the second embodiment, the process in steps S70 to S74 is executed in place of steps S45 and S46 shown in FIG. 10. The process in step S75 is executed in place of step S50 in FIG. 10. In step S421 shown in FIG. 10, variable c2 is initialized, but since variable c2 is not used and therefore is not initialized. Otherwise, the same process as shown in FIG. 10 is executed.

Figure 20:
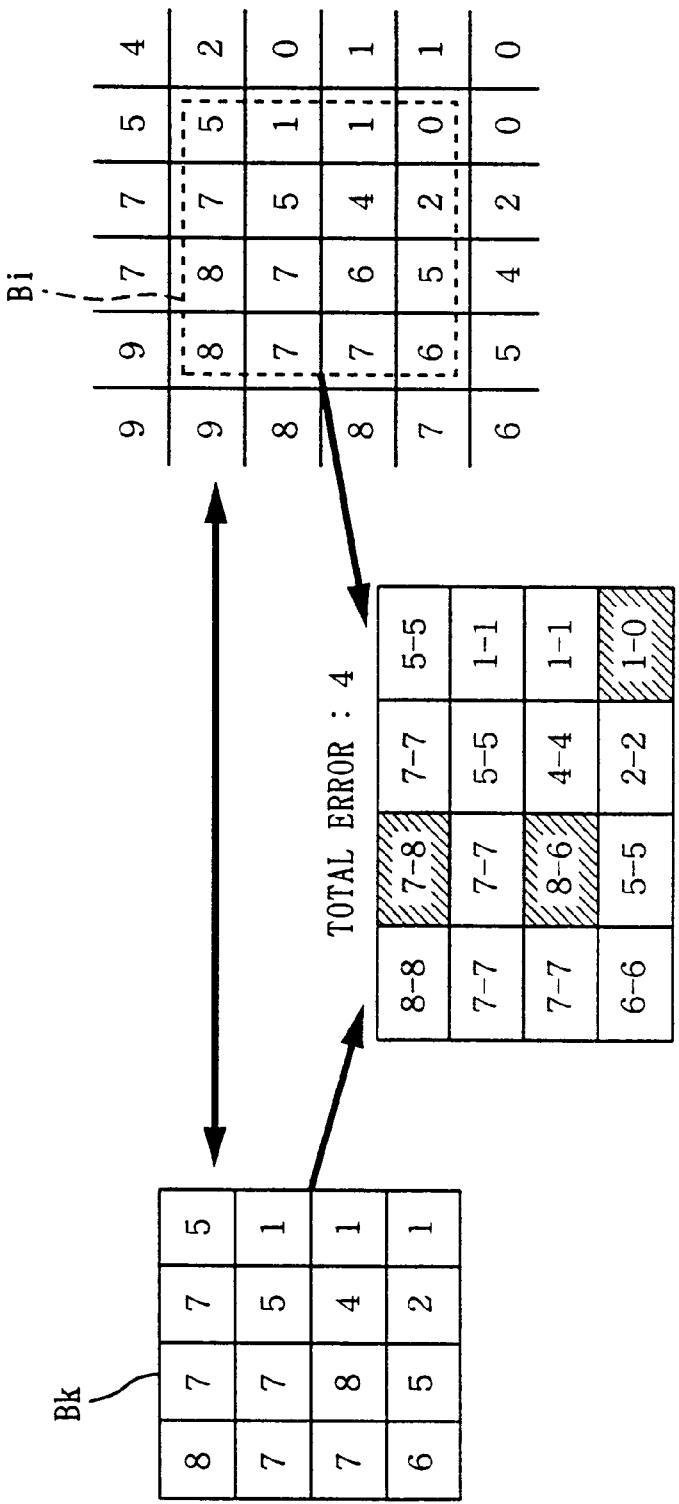
FIG. 20 is an illustration showing a method of calculating the number of pixels with different densities between block regions in step S74 in FIG. 17.

More specifically, while, in the first embodiment, the density information of a pixel at a projection point (X, Y) of Voxel 12 to image i is accumulated in Voxel 12 as shown in FIG. 12, in the second embodiment, a block region Bk formed by a plurality of pixels including a projection point (Xk, Yk) of Voxel 12 to the central image k is compared to a block region Bi formed by a plurality of pixels including a projection point (Xi, Yi) of Voxel 12 to peripheral images i as shown in FIG. 20, and the number of pixels having different density information are accumulated in Voxel 12.

More specifically, the projection point (Xk, Yk) of a Voxel (x, y, z) to central image k is calculated in step S70. Then in step S71, a block region Bk formed by mxn pixels including the projection point (Xk, Yk) is set. Then in step S72, a projection point (Xi, Yi) of the Voxel (x, y, z) to peripheral images i is calculated. Then in step S73, a block region Bi formed by mxn pixels including the projection point (Xi, Yi) is set.

Subsequently in step S74, c0(x, y, z) is incremented, such that the number of pixels having different density information accumulated in each Voxel (x, y, z) is counted. Block region Bk is compared to block region Bi, and the sum dif(Bk, Bi) of the absolute value ≡LMk-LMi≡ of the difference between densities LMk and L is added to c1(x, y, z). For example, as shown in FIG. 20, when block regions Bk and Bi formed by 4×4 pixels are set, the density information of three pixels among the 16 pixels is different between block regions Bk and Bi, and the total of the absolute value of the difference is "4", and therefore "4" is added to c1(x, y, z) as dif(Bk, Bi).

As a result, the sum of the absolute value of the density difference is set to c1(x, y, z)

Thereafter, the average value s(x, y, z) of the sums of the absolute values of the density differences accumulated in Voxels (x, y, z) in step S75 is calculated. Average value s(x, y, z) is used in place of the standard deviation as a dispersion evaluation value.

As described above, according to the second embodiment, the dispersion of the density information between object images is evaluated for each of blocks Bk and Bi, a three-dimensional model 18 of object of interest 10 may be produced more precisely.

In this embodiment, at the time of evaluating the dispersion of the density information between object images between blocks, the sum of the absolute value |LMk−LMi| of the difference between pixels in the block is used, the sum of the square (LMk−Lmi)² of the difference between pixels in the block may be used. Furthermore, the average value of standard deviations for each pixel in the block may be used.
Third Embodiment FIG. 21 is a flow chart for use in illustration of partial surface estimation process in a three-dimensional modeling apparatus according to a third embodiment of the invention. In this embodiment, in order to produce partial surface Sp(k) as accurate as possible, the dynamic programming method shown in FIG. 13 is employed, which increases the amount of calculation. Therefore, in the third embodiment, as will be described, a Voxel having the smallest standard deviation may be simply estimated as partial surface Sp(k).

Figure 22:
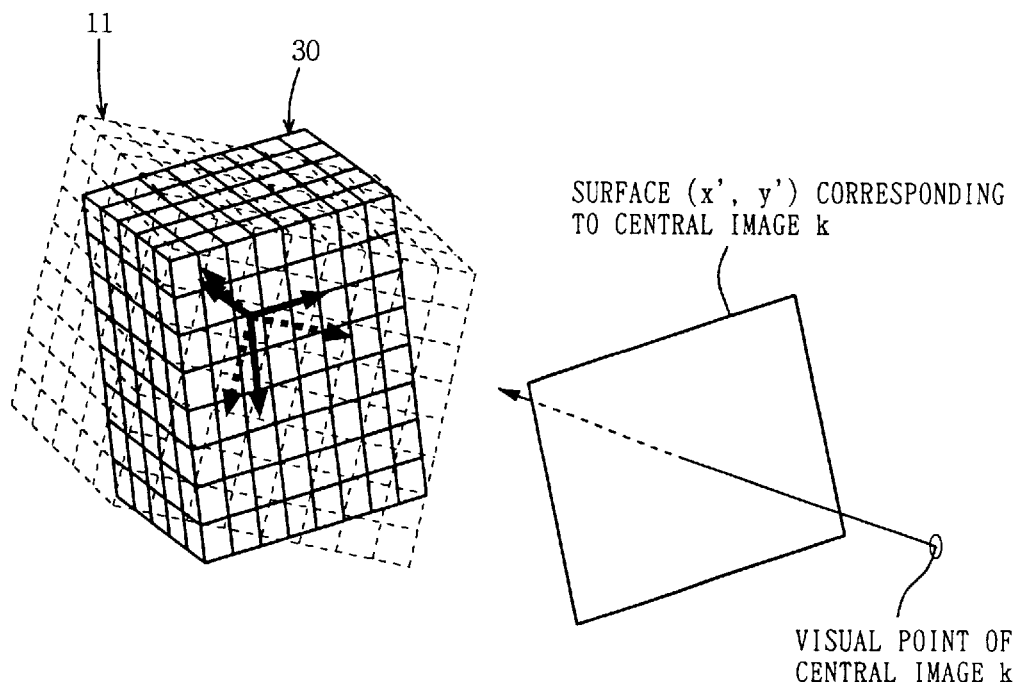
FIG. 22 is a view showing how a Voxel space is transformed into another Voxel space in a rectangular coordinate system in step S300 in FIG. 21.

In step S300, Voxel space 11 is subjected to coordinate transformation according to each central image k. Herein, as shown in FIG. 22, Voxel space 11 in the rectangular coordinate system is turned and then translated to be transformed to a Voxel space 30 again in the rectangular coordinate system. If the coordinate of each Voxel in Voxel space 11 before the coordinate transformation is (x, y, z), the coordinate of each Voxel in Voxel space 30 after the coordinate transformation is (x', y', z'), and EuleLian angles for rotational transformation are Φ, θ and Φ, respectively, the coordinate transformation can be expressed by the following expression $$\begin{pmatrix} x' \\ y' \\ z' \end{pmatrix} = \begin{pmatrix} \cos\phi & -\sin\phi & 0 \\ \sin\phi & \cos\phi & 0 \\ 0 & 0 & 1 \end{pmatrix} \begin{pmatrix} \cos\theta & 0 & \sin\theta \\ 0 & 1 & 0 \\ -\sin\theta & 0 & \cos\theta \end{pmatrix} \begin{pmatrix} \cos\psi & -\sin\psi & 0 \\ \sin\psi & \cos\psi & 0 \\ 0 & 0 & 1 \end{pmatrix} \begin{pmatrix} x \\ y \\ z \end{pmatrix} + \begin{pmatrix} xs \\ ys \\ zs \end{pmatrix} \quad (1)$$

Note that (xs, ys, zs) in Expression (1) are vectors from the center of Voxel space 11 before the transformation to visual points of central image k. The Voxel space after the rotational transformation is translated according to the vectors (xs, ys, zs), and becomes a Voxel space 30 after the transformation. After such coordinate transformation, coordinate y' is initialized to the minimum value y'min in step S301, coordinate x' is initialized to the minimum value x'min in step S302, coordinate z' is initialized to the minimum value z'min in step S303, standard deviation temporary variable stmp is initialized to the infinite ∞, while coordinate temporary variable ztmp is initialized to the infinite ∞.

It is then determined in step S3030 whether or not the presence/absence variable v(x', y', z') is "0", in other words, if the Voxel (x', y', z') is the presence region of object of interest 10. If v(x', y', z')≠0, in other words, if v(x', y', z')=1, the value of standard deviation temporary variable stmp is compared to the standard deviation s(x', y', z') of a Voxel at coordinates (x', y', z') in step S304. If the value of standard deviation temporary variable stmp is larger than the standard deviation s(x', y', z') of the Voxel, standard deviation s(x', y', z') is newly set for standard deviation temporary variable stmp in step S305, and coordinate z' at the time is set for positional temporary variable ztmp.

By steps S306 and S307, the process in steps S304 and S305 is executed for all the coordinates z'(=z'min to z'max). As a result, a Voxel with the minimum standard deviation is specified among the plurality of Voxels having the same x'y' coordinates in Voxel space 30 after the transformation. The z' coordinate of the Voxel having the smallest standard deviation thus specified is set for surface variable surface (x', y') in step S308. Surface variable surface (z', y') is set with respect to each central image k. More specifically, surface variable surface (x', y') represents the position of the surface of the shot object of interest on each central image k. Note that if the positional temporary variable ztmp is ∞ at this point, the surface of object corresponding to surface variable surface (x', y') is not present.

Figure 23:
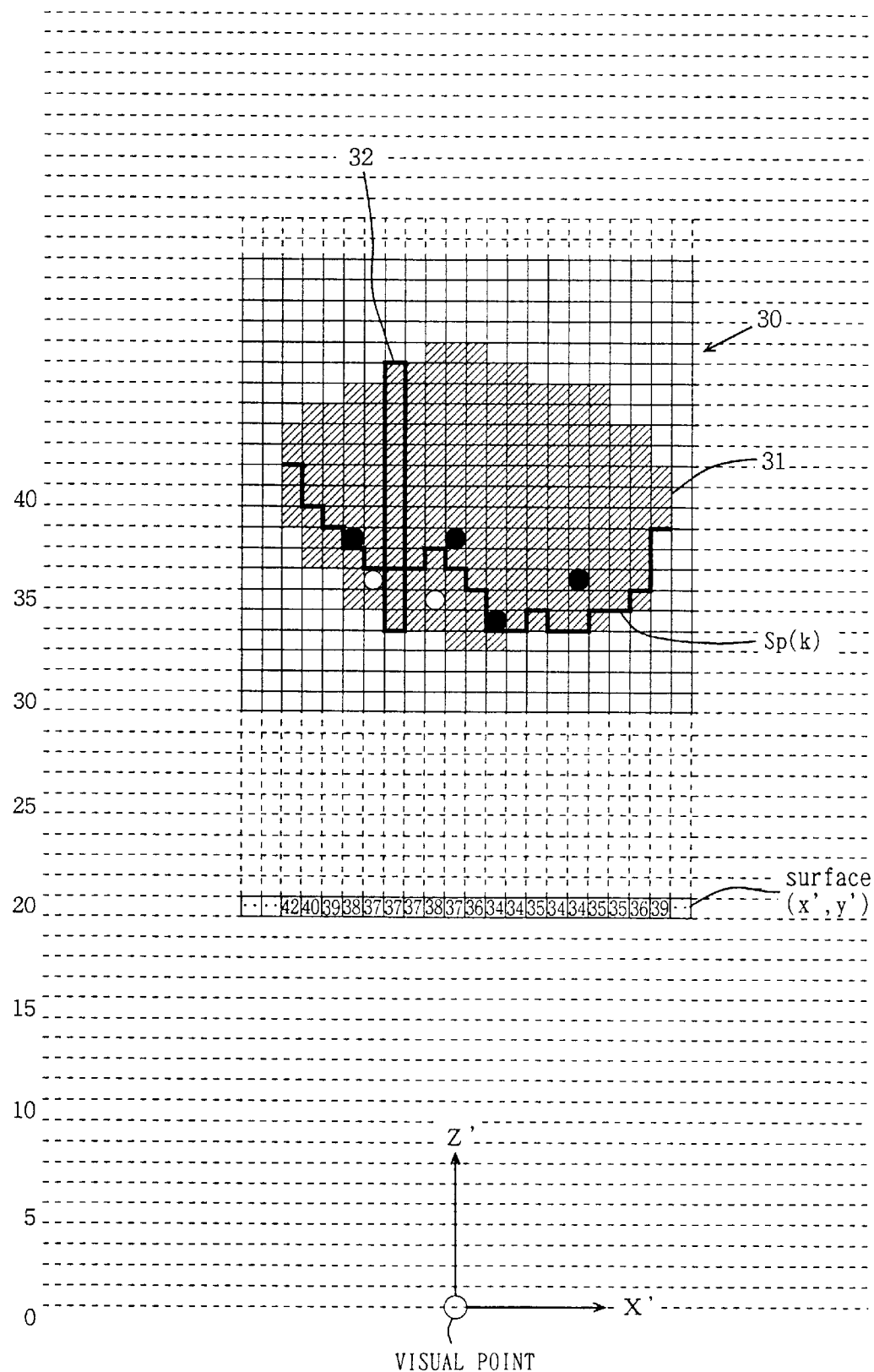
FIG. 23 is an illustration showing a method of specifying partial surfaces when a Voxel space in the rectangular coordinate system is transformed into another Voxel space in the rectangular coordinate system according to the flow chart shown in FIG. 21 and a method of integrating the surfaces.

FIG. 23 shows the Y'=y' plane in Voxel space 30 after the transformation. An approximate shape 31 of object of interest 10 estimated by the voting process is shown in Voxel space 30. Each Voxel in approximate shape 31 is provided with standard deviation s(x', y', z'). The steps S304 to S307 specify a Voxel having the smallest standard deviation s(x', y', z') among a plurality of Voxels 32 having the same x'y' coordinates. Herein, a Voxel at z'=37 has the smallest standard deviation. The step S308 applies the coordinate z' of the Voxel having the smallest standard deviation to coordinates corresponding to surface variable surface (x', y').

Then in steps S309 and S310, the process in steps S303 to S308 is executed to all the coordinates x'(=x'min to x'max) on the Y'=y' plane. By steps S311 and S312, the process in steps S302 to S310 is executed to all the coordinates y'(=y'min to y'max). Thus, the partial surface Sp(k) of object of interest 10 is determined, and the coordinate z' of a Voxel in partial surface Sp(k) is applied to surface variable surface (x', y').

The above-described method is employed in place of the dynamic programming method in FIG. 13, and the method will be hereinafter called "the minimum dispersion search method by coordinate transformation".

Partial surfaces Sp(k) obtained for central images k by the method are integrated into one surface by means of the distance penalty method as described above or by a simple voting method as will be described, so that the shape of object of interest 10 is determined. As shown in FIG. 23, for example, Voxels represented by ● are determined to be inside object of interest 10, while Voxels represented by ○ are determined to be outside object of interest 10.

By thus simply specifying a Voxel having the smallest standard deviation to estimate the shape of object of interest 10, partial surface Sp(k) may be determined at a higher speed than the dynamic programming method described above.

Variation of Third Embodiment

Figure 24:
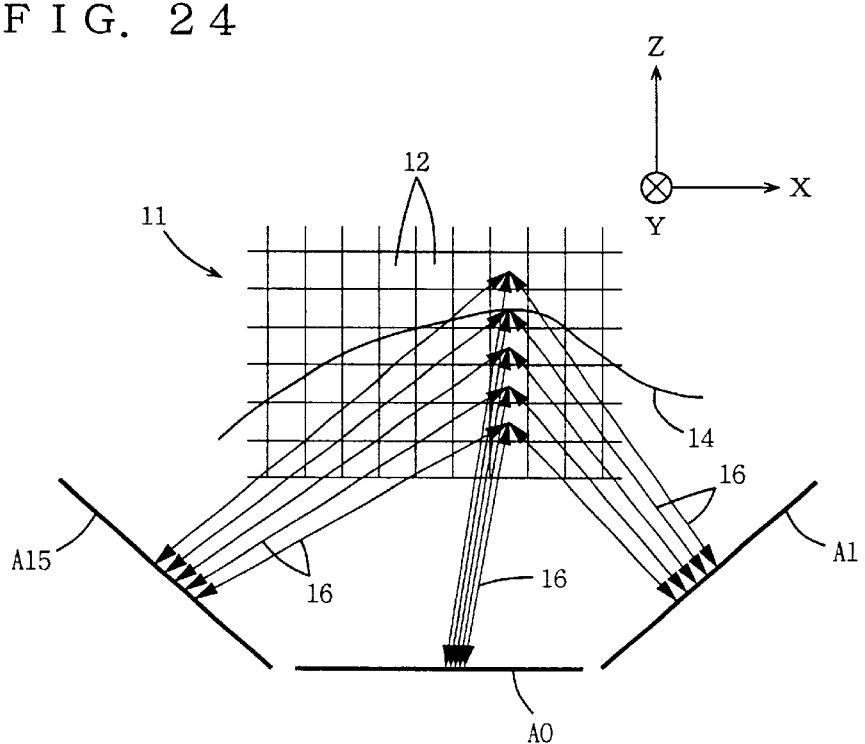
FIG. 24 is an illustration showing the process of color-voting when projection points from a plurality of Voxels having the same xy coordinates to the central image are different, for the purpose of clarifying the reason why the Voxel with the minimum standard deviation is not necessarily positioned on a partial surface of an object of interest.

In the above-desclibed embodiment, the Voxel having the smallest standard deviation among a plurality of Voxels having the same xy coordinates in Voxel space 11 in the rectangular coordinate system is not necessarily positioned at the true surface 14 of object of interest 10. This is partly because of image noises, but mainly originates from the method of calculation. The reason will be described in detail in conjunction with FIGS. 9 and 24.

Figure 9:
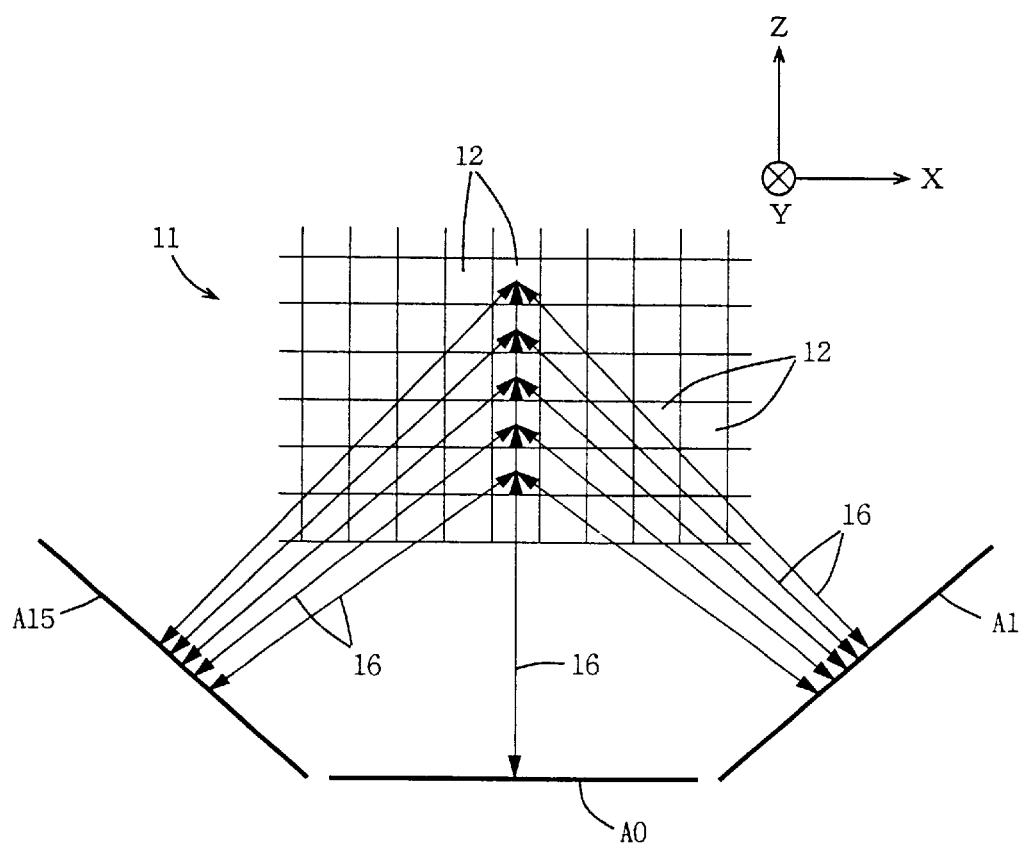
FIG. 9 is an illustration showing the process of color voting shown in FIG. 7.

As shown in FIG. 9, in Voxel space 11 in the rectangular coordinate system, if a projection line 16 from Voxel 12 to object image A0 to serve as the central image is at the same position on object image A0, Voxel 12 having the smallest standard deviation among a plurality of Voxels 12 having the same xy coordinates may be considered to be positioned on the true surface of object of interest 10, regardless if the color of the projection point to object image A0 of the Voxel at the true surface is complicated or monochrome, as long as the illumination conditions does not greatly change. The above projection line 16 from Voxel 12 to the object of interest A0 to serve as the central image is however based on perspective projection, projection lines 16 from the plurality of Voxels 12 having the same xy coordinates to object image A0 are often located at different positions on object image A0. In this case, if color complexity exists in the vicinity of projection point from Voxel 12 positioned on true surface 14 to object image A0, and if a single color is present at projection points from other Voxel 12 to object image A0 serving as the central image and object images A1 and A15 as the peripheral images, the standard deviation of a Voxel which is not present on the true surface 14 is sometimes smaller than the standard deviation of a Voxel positioned on true surface 14.

Figure 25:
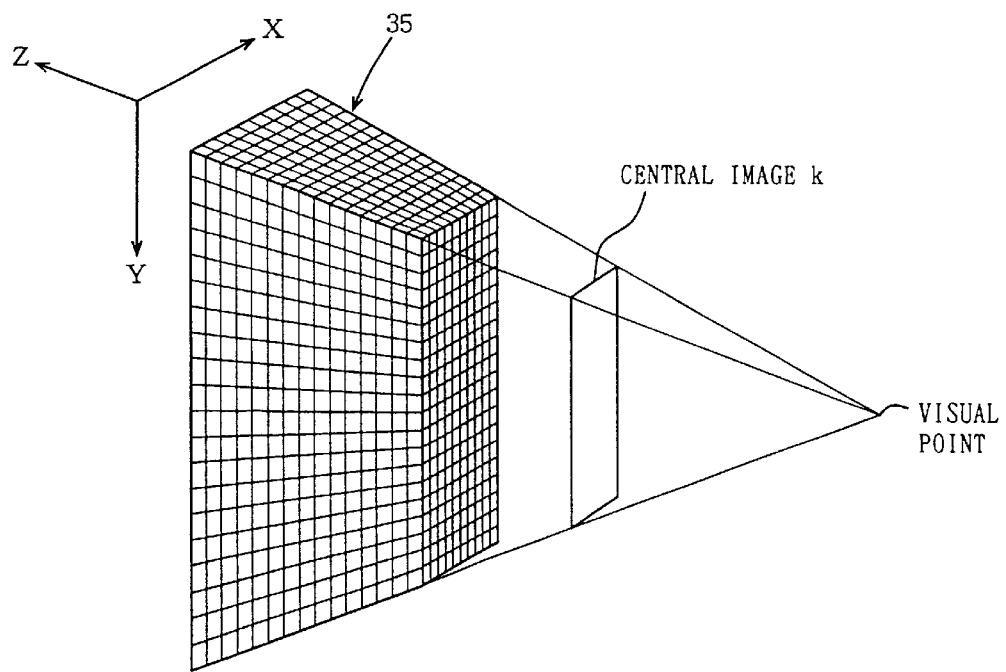
FIG. 25 is a perspective view showing a Voxel space in a perspective coordinate system which can be used in the coordinate transformation in step S300 in FIG. 21.

Hence, in place of the coordinate transformation from a rectangular coordinate system to a rectangular transform system in step S300 shown in FIG. 21, the coordinate transformation may be executed from the orthogonal transform system to a perspective coordinate system as shown in FIG. 25. A Voxel space 35 in the perspective coordinate system takes a conical shape having, as a vertex, a visual point of central image k.

Figure 26A:
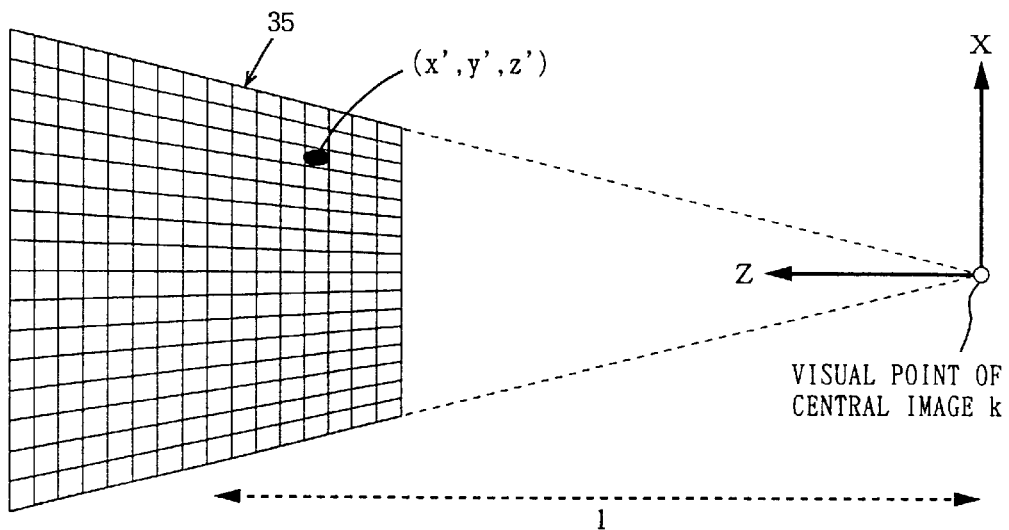
FIG. 26A is a top view of the Voxel space in the perspective coordinate system in FIG. 25 viewed in the Y-direction.
Figure 26B:
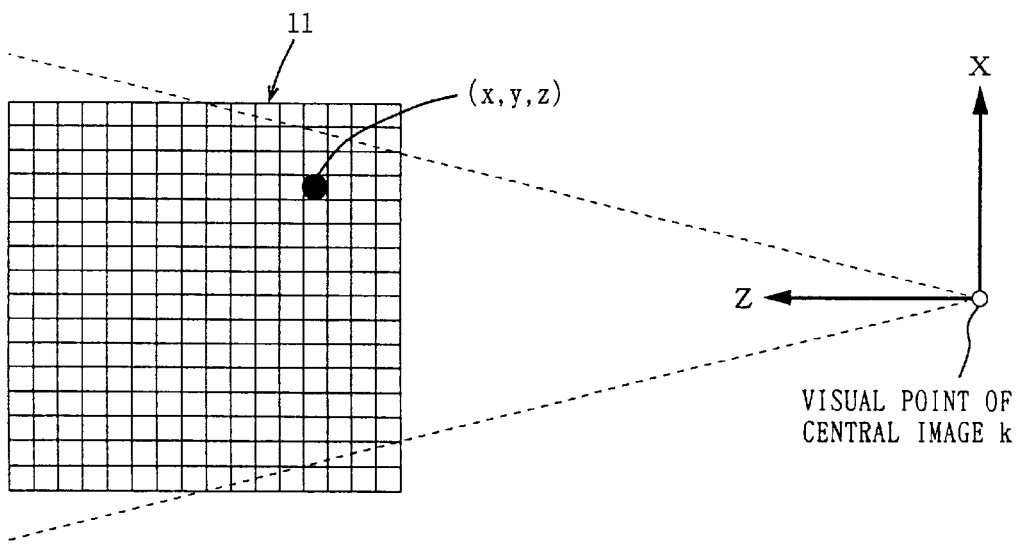
FIG. 26B is a top view of the Voxel space in the rectangular coordinate system shown in FIG. 6 viewed in the Y-direction.

FIG. 26A shows Voxel space 35 in the perspective coordinate system shown in FIG. 25 viewed in the Y-direction, and FIG. 26B shows Voxel space 11 in the rectangular coordinate system shown in FIG. 6 in the Y-direction. If the distance from the visual point of central image k to the center of Voxel space 11 is 1, the coordinate transformation from the rectangular coordinate system to the perspective coordinate system may be expressed by the following expression (2).

$$x'=x \cdot 1/z, \ y'=y \cdot 1/z, \ z'=z \qquad (2)$$

Figure 27:
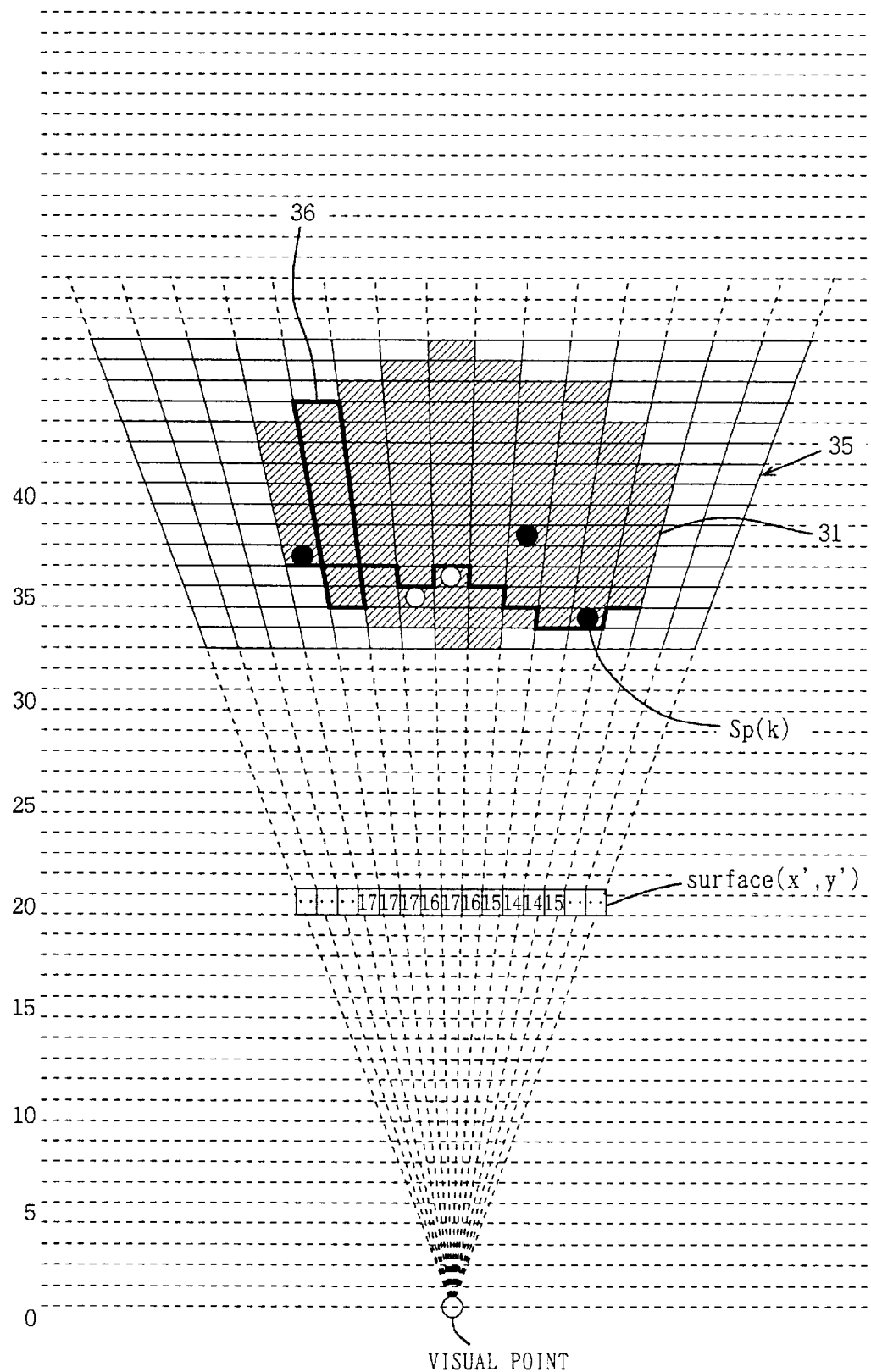
FIG. 27 is an illustration showing a method of specifying partial surfaces when a coordinate transformation to a Voxel space in the perspective coordinate system shown in FIG. 25 is performed in step S300 in FIG. 21, and a method of integrating the surfaces.

Similarly in Voxel space 35 in such perspective coordinate system, a Voxel with the smallest standard deviation is specified among a plurality of Voxels 36 having the same x'y' coordinates as shown in FIG. 27, and the coordinate z' of the specified Voxel is applied to surface variable surface (x', y'). However, the value applied to surface variable surface (x', y') is the distance from the central image in which variable surface (x', y') is set to the Voxel with the smallest standard deviation. Thus, Voxels with the smallest standard deviation among Voxels on the straight line passing through the visual point of each central image k are coupled in Voxel space 35 in the perspective coordinate system, and the partial surface Sp(k) of object of interest 10 is determined.

Note that by the partial surface integration process, Voxels represented by ● in FIG. 27 is determined to be inside object of interest 10, and Voxels represented by ○ are determined to be outside object of interest 10.

Thus executing a coordinate transformation in the Voxel space in the perspective coordinate system allows the shape of object of interest 10 to be readily and accurately estimated by specifying a Voxel having the smallest standard deviation. The minimum dispersion method by means of such coordinate transformation can determine partial surface Sp(k) at a higher speed than the dynamic programming method described above, and therefore the work area of memories necessary for the process may be reduced.

Fourth Embodiment

Figure 28:
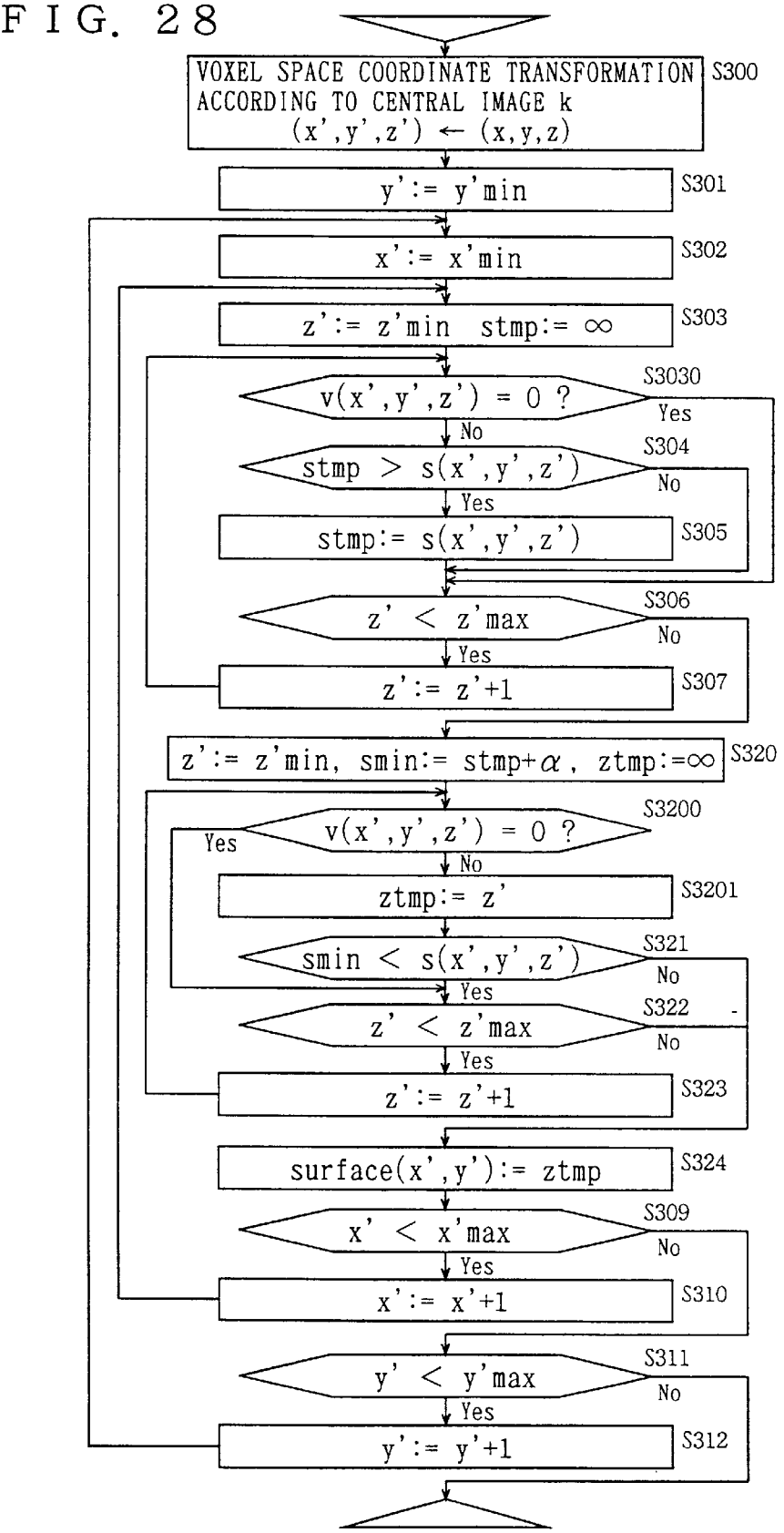
FIG. 28 is a flow chart for use in illustration of details of the process of estimating a partial surface in a three-dimensional modeling apparatus according to a fourth embodiment of the invention.

FIG. 28 is a flow chart for use in illustration of the process of estimating a partial surface in a three-dimensional modeling apparatus according to a fourth embodiment of the invention. Herein, in place of step S308 shown in FIG. 21, steps S320 to S324 are provided. This method specifies a partial surface on or outside partial surface Sp(k) in the third embodiment, and will be hereinafter referred to as "quasi minimum dispersion search method by coordinate transformation".

As described above, in steps S304 to S307, a Voxel with the minimum standard deviation is specified among Voxels having the same x'y' coordinates.

In step S320, the minimum standard deviation is added with a prescribed value α and the result is set for minimum standard deviation variable smin. In steps S320 to S323, a Voxel having a standard deviation equal to or smaller than [minimum standard deviation +α] is specified among a plurality of Voxels having the same x'y' coordinates. At this time, the Voxels are searched in the direction from z'min to z'max. As a result, if a Voxel having a standard deviation equal to or smaller than [minimum standard deviation +α] is present outside a Voxel having the smallest standard deviation, the coordinate z' of that Voxel is set for surface variable surface (x', y') in step S324. In this case, a partial surface is specified outside partial surface Sp(k) shown in FIG. 23 or 27. Note that if a Voxel with a standard deviation equal to or smaller than [minimum standard deviation +α] is not present outside the Voxel with the smallest standard deviation is set for surface variable surface (x', y'), and a partial surface is specified on surface Sp(k) shown in FIG. 23 or 27.

As described above, in the fourth embodiment, a Voxel having a standard deviation slightly larger than the minimum standard deviation is specified, based on which partial surface Sp(k) is estimated, and therefore, a partly removed three-dimensional model will not be produced if noises are input due to the fluctuation of illumination conditions or the like.

Fifth Embodiment

Figure 29:
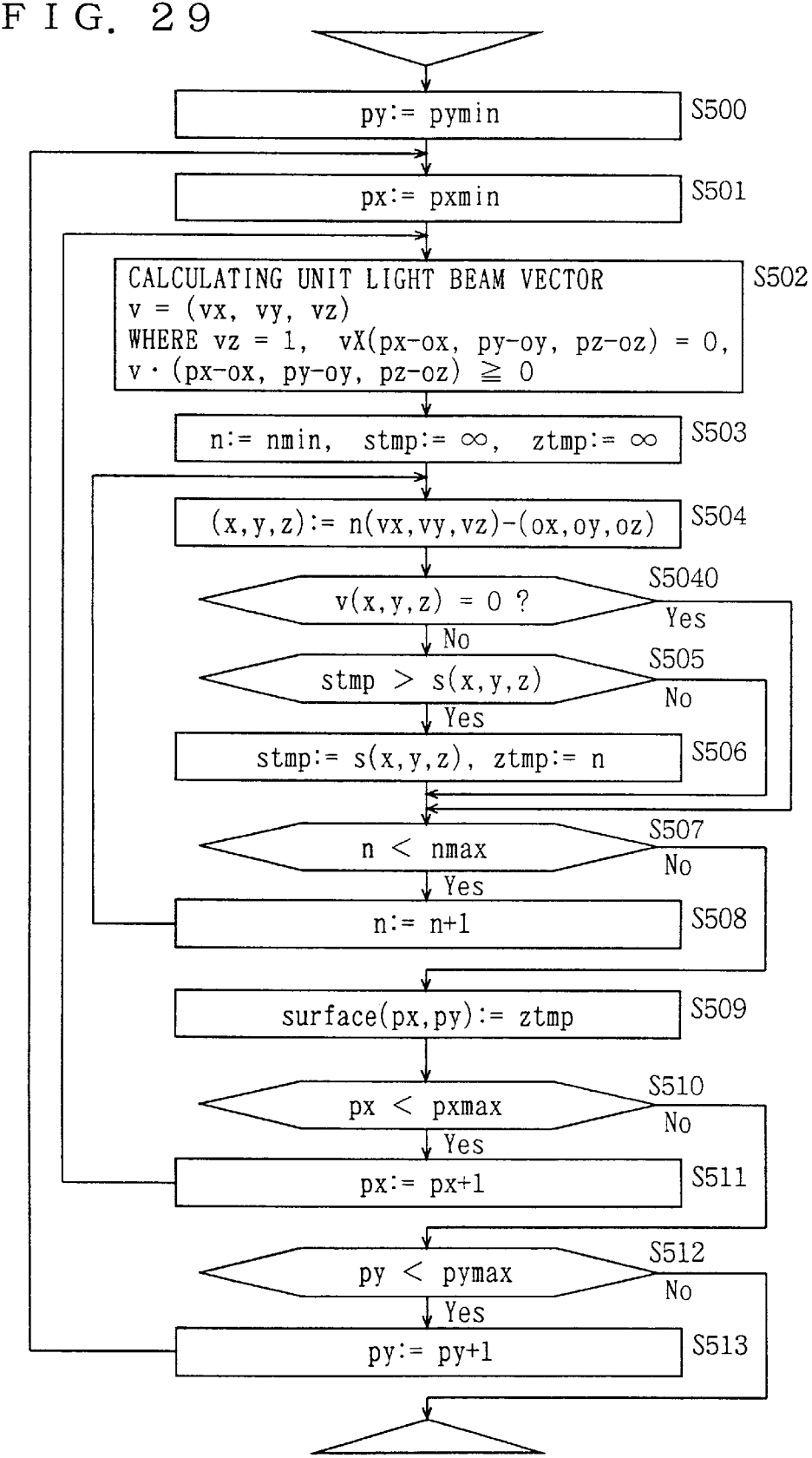
FIG. 29 is a flow chart for use in illustration of details of the process of estimating a partial surface in a three-dimensional modeling apparatus according to a fifth embodiment of the invention.

FIG. 29 is a flow chart for use in illustration of the process of estimating a partial surface in a three-dimensional modeling apparatus according to a fifth embodiment of the invention. By the method, unlike the above embodiments, a partial surface of object of interest 10 is estimated by specifying a Voxel with the smallest standard deviation in view of visibility from a visual point to a Voxel space without a coordinate transformation in the Voxel space, and the method will be hereinafter referred to as "the minimum dispersion search method by ray tracing".

Figure 30:
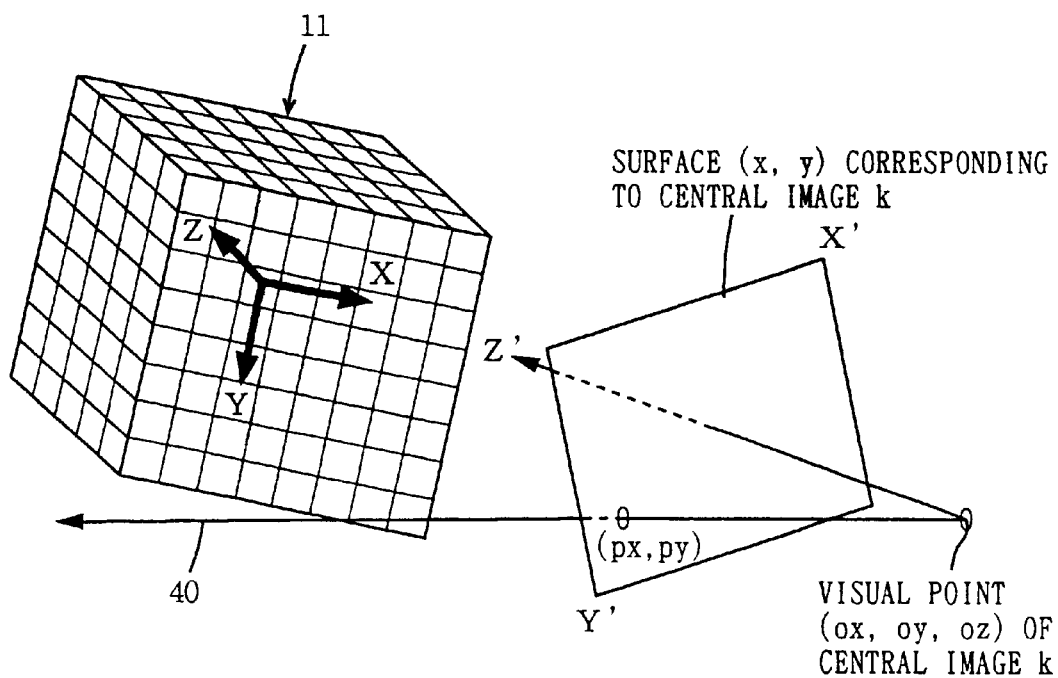
FIG. 30 is an illustration showing a coordinate system used in the flow chart shown in FIG. 29.
Figure 33:
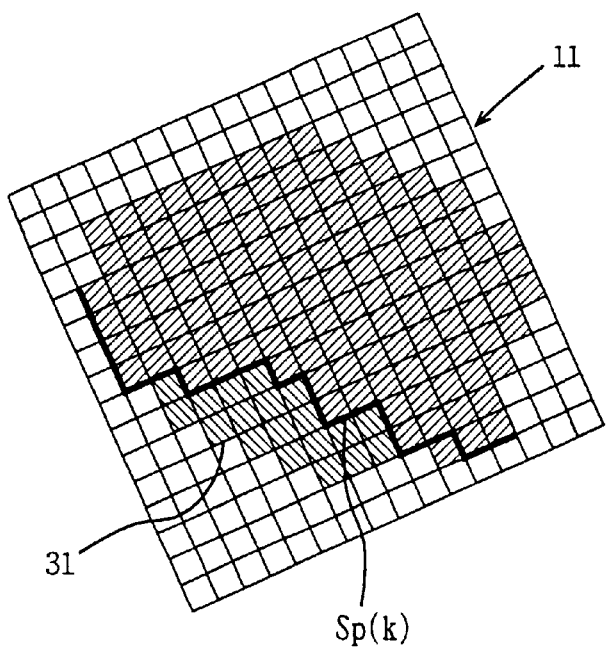
FIG. 33 is an illustration showing a Voxel having one partial surface specified by the method of searching minimum dispersion by light tracing shown in FIG. 29.

Now, coordinates (px, py, pz) as shown in FIG. 30 will be defined. The coordinates of a visual point of central image k are defined as (ox, oy, oz). The Z' coordinate axis is provided in the direction from the visual point (ox, oy, oz) to the center of Voxel space 11, and the X' and Y' coordinate axes are provided on central image k. The x'y' coordinates at which a light beam emitted radially from visual point (ox. oy, oz) passes through central image k is defined as (px, py), and the z' coordinate of central image k is defined as pz.

As shown in FIG. 29, minimum value pymin is set for coordinate py in step S500, and then minimum pxmin is set for coordinate px in steps S501.

Subsequently, in step S502, unit light beam vector v=(vx, vy, vz) is calculated. The following Expressions (3) to (5) are established herein.

$$vz=1 \qquad (3)$$

$$vx(px-ox, \ py-oy, \ pz-oz)=0 \qquad (4)$$

$$v \cdot (px-ox, \ py-oy, \ pz-oz) \neq 0 \qquad (5)$$

If the outer product of vector v and vector (px−ox, py−oy, pz−oz) is 0, the vectors are laid in the same line (whether the arrowheads indicate the same direction or opposite directions is not known). If the inner product of vector v and vector (px−ox, py−oy, pz−oz) is 0 or more, these vectors are oriented in the same direction.

Then in step S503, minimum value nmin is set for a natural number n, the infinite ∞ is set for standard deviation temporary variable stmp, and the infinite ∞ is set for coordinate temporary variable ztmp.

Figure 31:
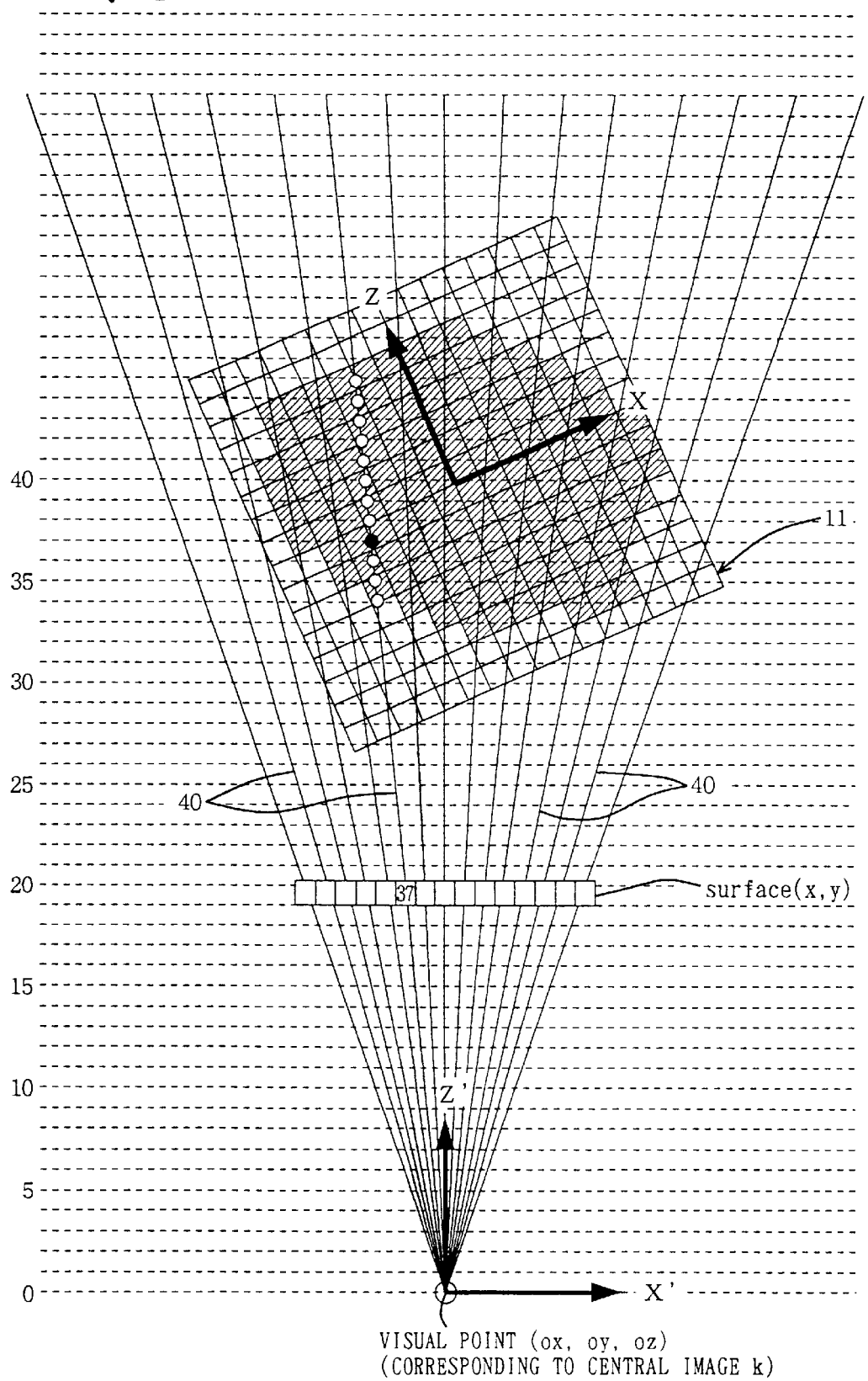
FIG. 31 is an illustration showing a method of searching the minimum dispersion by means of light tracing shown in FIG. 29.

In steps S504 to S508, as shown in FIG. 31, a Voxel with the smallest standard deviation is specified among a plurality of Voxels on each light beam 40 passing through a visual point (ox, oy, oz) in Voxel space 11 in the rectangular coordinate system. In FIG. 31, a plurality of Voxels (each represented by ○ or ●), Voxels represented by ● are specified.

More specifically, a Voxel positioned at coordinates (x', y', z') represented by a vector n times as large as unit light beam vector v is selected by referring to visual point (ox, oy, oz) in step S504.

It is then determined in step S5040 if Voxel (x, y, z) is the presence region of object of interest 10. If v(x, y, z)=1, the value of standard deviation temporary variable stmp is compared to the standard deviation s(x, y, z) of the selected Voxel in step S505. If the value of standard deviation temporary variable stmp is larger than standard deviation s(x, y, z), that standard deviation s(x, y, z) is set for standard deviation temporary variable stmp in step S506, and a natural number n at this time is set for positional temporary variable ztmp.

By steps S507 and S508, the process in steps S504 to S506 is executed for all the natural numbers (=nmin to nmax). Hence, a Voxel with the minimum standard deviation is specified among a plurality of Voxels positioned on light beam 40.

Then in step S509, the z' coordinate (set for positional temporary variable ztmp) of the specified Voxel is set for surface variable surface (px, py).

Subsequently, by steps S510 and S511, the process in the above steps S502 to S509 is executed for all the coordinates px.

Then, by steps S512 and S513, the process in the above steps S501 to S511 is executed for all the coordinates py(=pymin to pymax).

In FIG. 31, a Voxel represented by ● having the smallest standard deviation is specified among a plurality of Voxels on a single light beam 40 passing through visual point (ox, oy, oz). Since the pz coordinate of the specified Voxel is "37", "37" is set for a coordinate to which surface variable surface (x, y) on the central image k corresponds.

Figure 32:
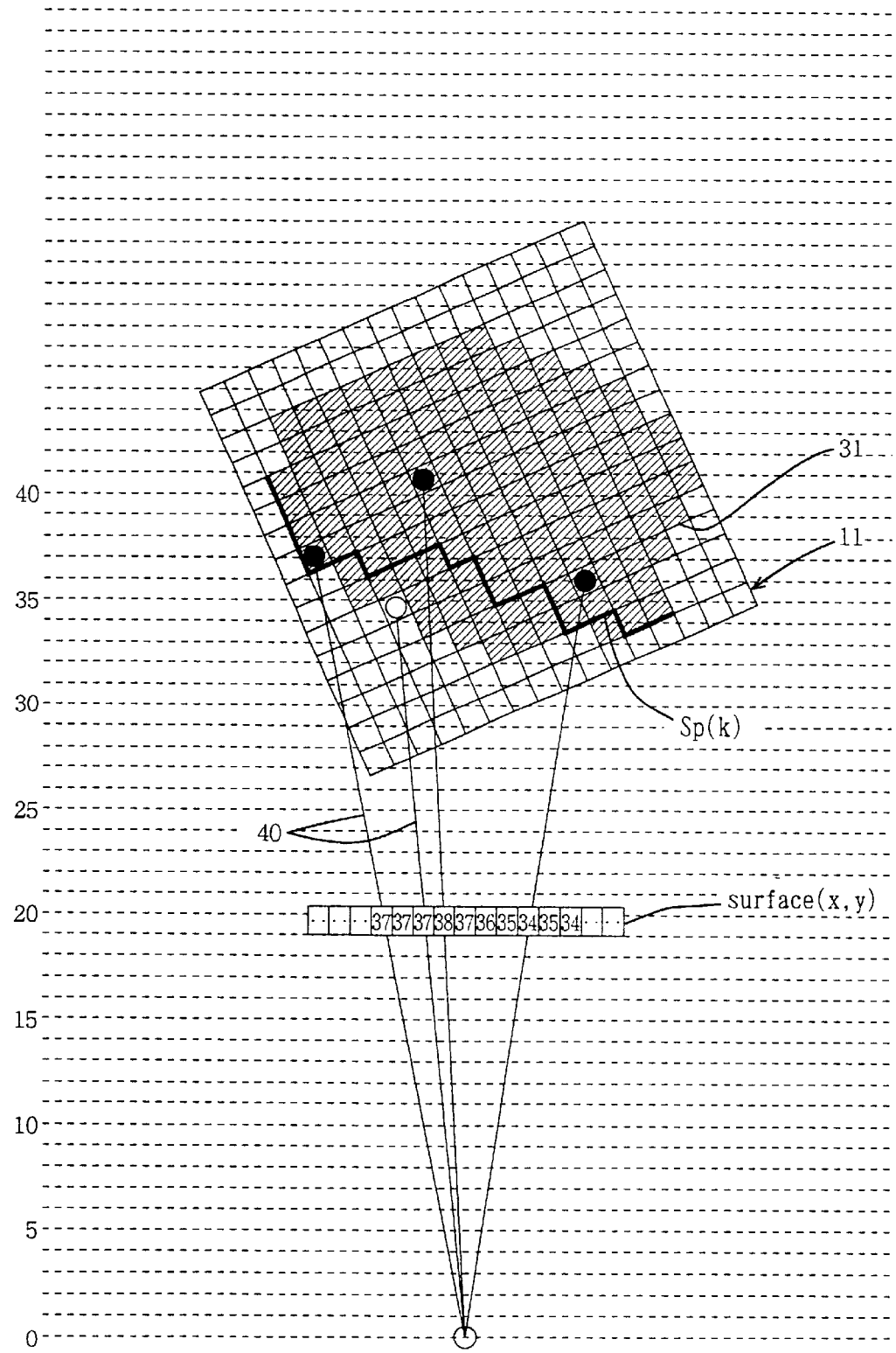
FIG. 32 is an illustration showing a method of integrating partial surfaces specified by the method of searching the minimum dispersion by means of light tracing shown in FIG. 29.

As described above, by setting the pz coordinate of the Voxel with the smallest standard deviation for surface variable surface (x, y) for each light beam 40, the partial surface Sp(k) of object of interest 10 is specified. The thus specified plurality of partial spaces Sp(k) are integrated into a single surface by means of the distance penalty method described above or the simple voting method which will be described, such that the shape of object of interest 10 is determined. As shown in FIG. 32, a Voxel represented by ○ positioned outside partial surface Sp(k) is positioned outside the object of interest, while a Voxel represented by ● positioned inside partial surface Sp(k) is positioned inside the object of interest 10.

As in the foregoing, in the fifth embodiment, a Voxel with the minimum standard deviation is specified among a plurality of Voxels on light beams radially emitted from visual points, the shape of object of interest 10 may be relatively accurately estimated. The minimum dispersion search method by means of such light tracing allows partial surface Sp(k) to be determined at a higher speed than the dynamic programming method as described above, which reduces the work area of memories necessary for the process.

Sixth Embodiment

Figure 34:
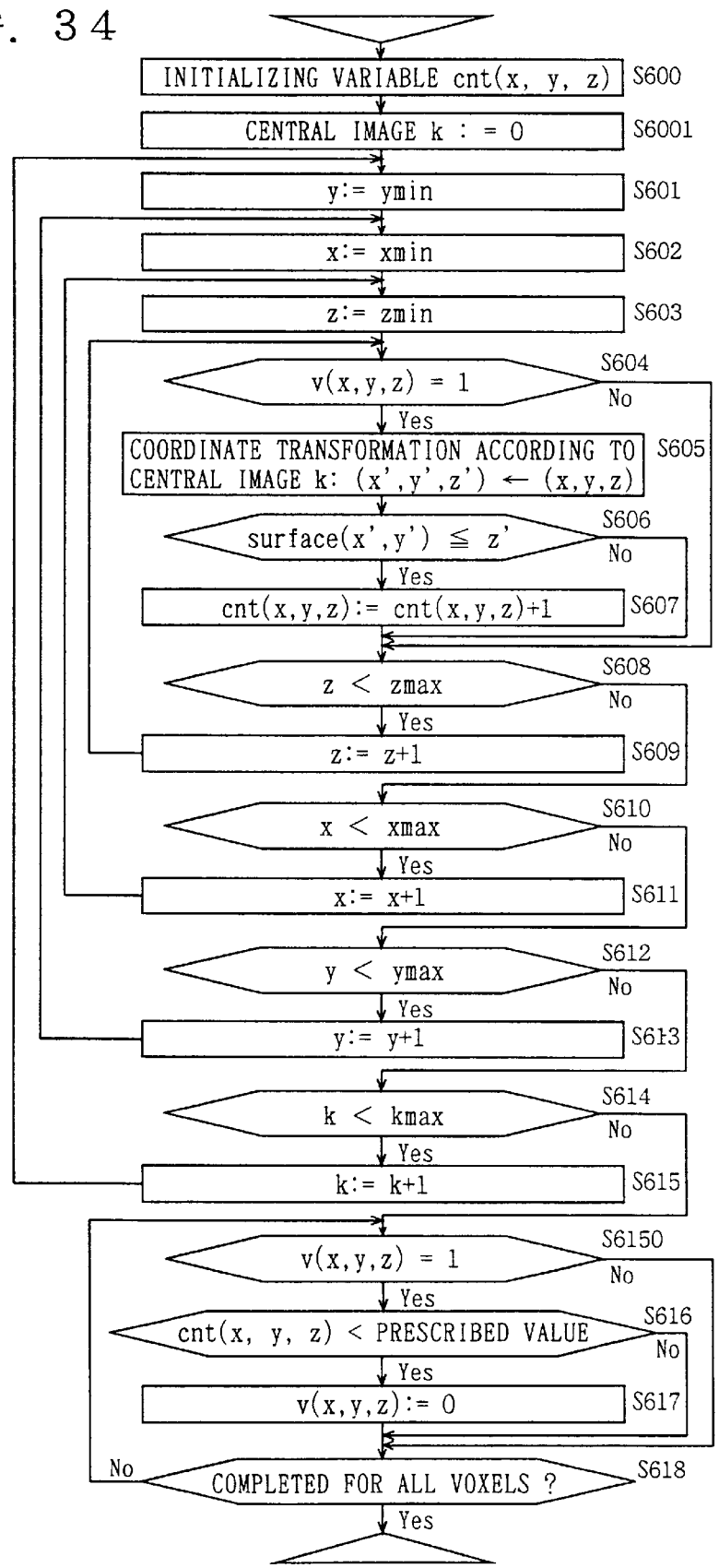
FIG. 34 is a flow chart for use in illustration of details of the process of integrating partial surfaces in a three-dimensional modeling apparatus according to a sixth embodiment of the invention.

FIG. 34 is a flow chart for use in illustration of the process of integrating partial surfaces in a three-dimensional modeling apparatus according to a sixth embodiment of the invention. This method is employed in place of the distance penalty method, and a plurality of partial surfaces Sp(k) obtained by means of the partial surface estimation process are integrated into a single surface to determine the shape of the object of interest. The method will be hereinafter referred to as "the simple voting method".

Figure 35A:
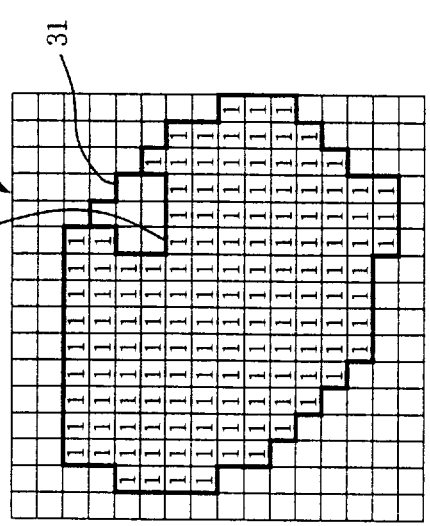
FIGS. 35A to 35E are illustrations showing the simple voting method shown in FIG. 34.
Figure 35B:
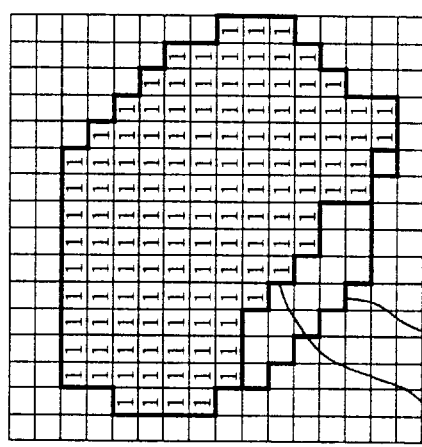
Figure 35C:
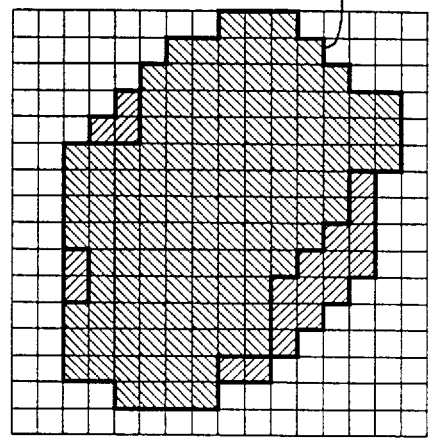
Figure 35D:
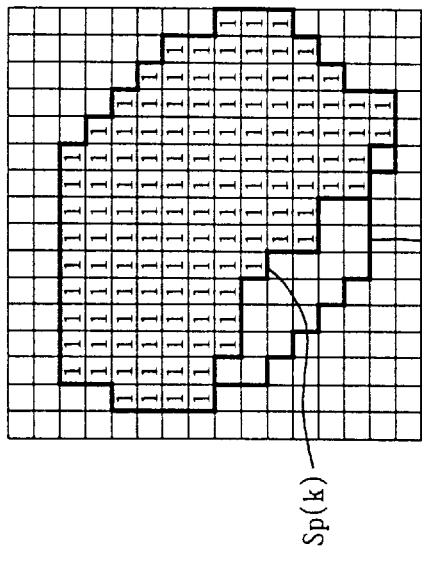
Figure 35E:
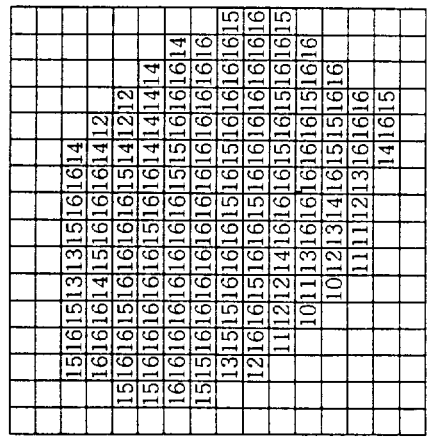

FIGS. 35A to 35C show Voxel spaces where partial surface Sp(k) from each viewing direction is determined. Herein, a Voxel inside an estimated approximate shape 31 and inside partial surface Sp(k) is provided with point "1". If such points are voted for a Voxel space, the Voxel space as shown in FIG. 35D is obtained. Herein, since object of interest 10 is viewed from 16 points, the maximum points obtained by each Voxel is "16". Voxels with higher points are more likely to be the true presence region of object of interest 10, and a Voxel having a vote (the number of points) of "14" or larger is estimated as the true presence region 45 of object of interest 10 as shown in FIG. 35E, taking into account noises caused by the fluctuation of surface conditions or the like.

More specifically, as shown in FIG. 34, variable cnt(x, y, z) is initialized in step S600, and object image A0 is set as central image k in step S6001. Then in steps S601 to S603, minimum values ymin, xmin, and zmin are set for coordinates y, x, and z, respectively.

Subsequently in step S604, it is determined if a Voxel at coordinates (x, y, z) is within the approximate presence region of object of interest 10 based on the result in step S40 in FIG. 10. If the Voxel is within the approximate presence region, in other words, if v(x, y, z)=1, a coordinate transformation is executed according to central image k in step S605. Herein, coordinates (x, y, z) are transformed to coordinates (x', y', z') as described above.

It is then determined in step S606 if the Voxel is inside partial surface Sp(k), in other words, it is determined if surface (x', y')≦z' holds. If the Voxel is inside partial surface Sp(k), variable cnt(x, y, z) in step S607 is incremented.

Then, by steps S608 to S613, the process in steps S604 to S607 is executed to all the coordinates x (=xmin to xmax), all the coordinates y (=ymin to ymax), and all the coordinates z (=zmin to zmax). Thus, Voxel spaces as shown in FIGS. 35A to 35C result.

Then, by steps S614 and S615, the process in steps S601 to S613 described above is executed to all the central images k (=0 to kmax). As a result, a Voxel space as shown in FIG. 35D results.

It is then determined in steps S6 150 if the Voxel (x, y, z) is the presence region of object of interest 10. If v(x, y, z)=1, the variable cnt(x, y, z) of each Voxel is compared to a prescribedvalue ("14" in this case). If variable cnt(x, y, z) is smaller than the prescribed value, the Voxel is determined to be outside the presence region of object of interest 10 in step S617, in other words variable, v(x, y, z) is set to 0.

Then in step S618, the process in steps S616 and S617 is executed to all the Voxels by step S618, and a Voxel as shown in FIG. 35E results. The shape 45 of object of interest 10 is determined as a result.

As in the foregoing, in the sixth embodiment, a plurality of estimated partial surfaces Sp(k) are integrated by means of the simple voting method, and the shape of object of interest 10 may be determined at a higher speed than the distance penalty method as described above.

Note that the preferred embodiments of the present invention have been described, the invention is by no means limited to the above described embodiments. For example, although the density is employed as image information in the above embodiments, color may be employed instead, or alternatively combinations of color and density may be used. Furthermore, the standard deviation in image information is employed in the embodiments, and scattering of image information may be employed instead, in other words, any value for evaluating the dispersion of image information may be employed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A three-dimensional modeling apparatus for producing a three-dimensional model of an object, comprising:

an object image capturing device shooting said object from a plurality of visual points to obtain a plurality of object images;

a shape estimator estimating the shape of said object based on the dispersion of corresponding image information between at least two object images among said plurality of object images; and a producer producing said three-dimensional model based on said estimated shape.

2. The three-dimensional modeling apparatus as recited in claim 1, wherein the image information of said object image is color and/or density.

3. The three-dimensional modeling apparatus as recited in claim 1, wherein said shape estimator includes, an image information accumulator accumulating corresponding image information on said at least two object images in regions in a three-dimensional virtual space formed by a plurality of regions; and a calculator calculating the dispersion of the image information accumulated in said regions.

4. The three-dimensional modeling apparatus as recited in claim 3, further comprising a presence region estimator approximately estimating a presence region of said object in said three-dimensional virtual space based on the contours of said object in said plurality of object images, wherein said image information accumulator accumulates said image information in regions within said presence region among the regions in said three-dimensional virtual space.

5. The three-dimensional modeling apparatus as recited in claim 3, wherein said shape estimator further includes a coupler smoothly coupling regions with small said dispersion among the regions in said three-dimensional virtual space, in order to estimate the shape of said object.

6. The three-dimensional modeling apparatus as recited in claim 5, wherein said coupler minimizes an evaluation function having, as variables, the smallness of said dispersion and the smoothness of said regions to be coupled, in order to smoothly couple said regions with small dispersion.

7. The three-dimensional modeling apparatus as recited in claim 3, wherein said shape estimator further includes a coupler coupling regions with minimum said dispersion or a dispersion larger than the minimum value by a prescribed value among regions on a straight line passing through one of said visual points in said three-dimensional virtual space, in order to estimate the shape of said object.

8. The three-dimensional modeling apparatus as recited in claim 1, wherein said shape estimator includes, a partial surface estimator estimating a plurality of partial surfaces of said object, based on the dispersion of corresponding image information between said plurality of object images; and an integrator integrating said plurality of partial surfaces to determine the shape of said object.

9. The three-dimensional modeling apparatus as recited in claim 1, further comprising a presence region estimator approximately estimating a presence region of said object in said three-dimensional virtual space based on the contours of said object in said plurality of object images, wherein said shape estimator includes, an image information accumulator accumulating corresponding image information on said at least two object images in regions in a three-dimensional virtual space formed by a plurality of regions;

a calculator calculating the dispersion of said image information accumulated in said regions;

a partial surface estimator estimating a plurality of partial surfaces of said object based on said dispersion; and an integrator integrating said plurality of partial surfaces to determine the shape of said object, and said integrator including, a distance accumulator accumulating distances to said plurality of partial surfaces from a region inside said presence region and outside each of said partial surfaces among the regions of said three-dimensional virtual space; and a presumer presuming a region where the sum of said accumulated distances is larger than a prescribed value to be outside said object.

10. The three-dimensional modeling apparatus as recited in claim 1, further comprising a presence region estimator approximately estimating a presence region of said object in said three-dimensional virtual space based on the contours of said object in said plurality of object images, wherein said shape estimator includes, an image information accumulator accumulating corresponding image information on said at least two object images in regions in said three-dimensional virtual space formed by a plurality of regions;

a calculator calculating the dispersion of said image information accumulated in said regions;

a partial surface estimator estimating a plurality of partial surfaces of said object of image based on said dispersion; and an integrator integrating said plurality of partial surfaces to determine the shape of said object, said integrator including, a distance accumulator accumulating distances to said plurality of partial surfaces from a region inside said presence region and outside each of said partial surfaces among the regions of said three-dimensional virtual space;

an accumulation number calculator calculating the number of said accumulation; and a presumer presuming a region where the average value produced by dividing the sum of said accumulated distances by said calculated number of accumulation is larger than a prescribed value to be outside said object.

11. The three-dimensional modeling apparatus as recited in claim 1, wherein
said shape estimator includes,
an image information accumulator accumulating corresponding image information on said at least two object images in regions in a three-dimensional virtual space formed by a plurality of regions;
a calculator calculating the dispersion of the image information accumulated in said regions;
a partial surface estimator estimating a plurality of partial surfaces of said object based on said dispersion; and
an integrator integrating said plurality of partial surfaces to determine the shape of said object,
said integrator including,
a voter voting a prescribed value for a region inside each of said partial surfaces among the regions of said three-dimensional virtual space; and
a presumer presuming a region where the sum of said voted values is larger than a prescribed another value to be inside said object.

12. The three-dimensional modeling apparatus as recited in claim 3, wherein
said region is a Voxel, and said three-dimensional virtual space is a Voxel space.

13. The three-dimensional modeling apparatus as recited in claim 1, wherein
the dispersion of said image information is the standard deviation of said image information.

14. The three-dimensional modeling apparatus as recited in claim 1, wherein
said shape estimator includes,
a block setter setting blocks including a plurality of pixels for each of said object images; and
a calculator calculating the difference between the values of corresponding pixels between said blocks, and calculating the sum of the absolute value of the each calculated difference as the dispersion of said image information.

15. The three-dimensional modeling apparatus as recited in claim 1, wherein
said shape estimator includes,
a block setter setting blocks including a plurality of pixels for each of said object images; and
a calculator calculating the difference between the values of corresponding pixels among said blocks, and calculating the sum of the square value of the each calculated difference as the dispersion of said image information.

16. A three-dimensional modeling method for producing a three-dimensional model of an object of interest, comprising the steps of:
shooting said object from a plurality of visual points to obtain a plurality of object images;
estimating the shape of said object of interest based on the dispersion of corresponding image information between at least two object images among said plurality of object images; and
producing said three-dimensional model based on said estimated shape.

17. The three-dimensional modeling method as recited in claim 16, wherein
said step of estimating the shape includes the steps of:
estimating a plurality of partial surfaces of said object based on the dispersion of corresponding image information between said plurality of object images; and
integrating said plurality of partial surfaces to determine the shape of said object.

18. A medium recorded with a three-dimensional modeling program which instructs a computer to produce a three-dimensional model of an object based on a plurality of object images obtained by shooting said object from a plurality of visual points,
said program including the steps of:
estimating the shape of said object based on the dispersion of corresponding image information between at least two object images among said plurality of object images; and
producing said three-dimensional model based on said estimated shape.

19. The three-dimensional modeling program as recited in claim 18, wherein
said step of estimating a shape includes the steps of:
estimating a plurality of partial surfaces of said object based on the dispersion of corresponding image information among said plurality of object images; and
integrating said plurality of partial surfaces to determine the shape of said object.

20. A medium recorded with a three-dimensional shape estimation program to instruct a computer to estimate the shape of an object based on a plurality of object images obtained by shooting the object from a plurality of visual points,
said program including the steps of:
calculating the dispersion of corresponding image information between at least two object images among said plurality of object images; and
estimating the shape of said object based on said calculated dispersion.

* * * * *